United States Patent
Choi et al.

(10) Patent No.: US 11,034,363 B2
(45) Date of Patent: Jun. 15, 2021

(54) VEHICLE CONTROL DEVICE MOUNTED ON VEHICLE AND METHOD FOR CONTROLLING THE VEHICLE

(71) Applicant: LG Electronics Inc., Seoul (KR)

(72) Inventors: Heedong Choi, Seoul (KR); Duckgee Park, Seoul (KR)

(73) Assignee: LG Electronics Inc., Seoul (KR)

( * ) Notice: Subject to any disclaimer, the term of this patent is extended or adjusted under 35 U.S.C. 154(b) by 516 days.

(21) Appl. No.: 15/964,486

(22) Filed: Apr. 27, 2018

(65) Prior Publication Data

US 2019/0144001 A1 May 16, 2019

(30) Foreign Application Priority Data

Nov. 10, 2017 (KR) .................. 10-2017-0149703

(51) Int. Cl.
| | |
|---|---|
| H04W 4/00 | (2018.01) |
| B60W 50/14 | (2020.01) |
| G06K 9/00 | (2006.01) |
| H04W 4/46 | (2018.01) |
| G08G 1/01 | (2006.01) |
| G08G 1/0967 | (2006.01) |
| G08G 1/017 | (2006.01) |
| G08G 1/0965 | (2006.01) |

(52) U.S. Cl.
CPC ......... B60W 50/14 (2013.01); G06K 9/00791 (2013.01); G08G 1/017 (2013.01); G08G 1/0141 (2013.01); G08G 1/0965 (2013.01); G08G 1/09675 (2013.01); G08G 1/096791 (2013.01); H04W 4/46 (2018.02); B60W 2050/146 (2013.01)

(58) Field of Classification Search
CPC ....................................................... H04W 4/46
See application file for complete search history.

(56) References Cited

U.S. PATENT DOCUMENTS

| | | | |
|---|---|---|---|
| 5,905,434 A * | 5/1999 | Steffan ............. | B60Q 1/50 116/28 R |
| 8,520,695 B1 * | 8/2013 | Rubin ............... | H04W 56/0035 370/445 |

(Continued)

FOREIGN PATENT DOCUMENTS

| | | |
|---|---|---|
| JP | 2004139284 | 5/2004 |
| KR | 1020120107317 | 10/2012 |

(Continued)

OTHER PUBLICATIONS

Extended European Search Report in European Application No. 18203747.3, dated Apr. 5, 2019, 8 pages.

*Primary Examiner* — Truc M Do
(74) *Attorney, Agent, or Firm* — Fish & Richardson P.C.

(57) ABSTRACT

A vehicle control device includes a communication unit configured to couple to a first vehicle, and at least one processor that is configured to control, based on a preset condition being satisfied, the communication unit to enable communication between the first vehicle and a second vehicle that is different from the first vehicle, to receive, through the communication unit, an image that has been captured by a camera located at the second vehicle, and to control a display unit located at the first vehicle to display at least one of the received image or information related to the second vehicle.

20 Claims, 28 Drawing Sheets

(56) References Cited

U.S. PATENT DOCUMENTS

| | | | |
|---|---|---|---|
| 8,886,386 B2* | 11/2014 | Merk | G08G 1/096758 |
| | | | 701/28 |
| 10,464,421 B2* | 11/2019 | Watanabe | B60K 37/02 |
| 10,490,072 B2* | 11/2019 | Makke | G08G 1/096791 |
| 2003/0081127 A1* | 5/2003 | Kirmuss | G08G 1/054 |
| | | | 348/207.99 |
| 2004/0148090 A1* | 7/2004 | Melen | G01C 21/26 |
| | | | 701/482 |
| 2006/0214783 A1* | 9/2006 | Ratnakar | G08G 1/0175 |
| | | | 340/505 |
| 2010/0001967 A1* | 1/2010 | Yoo | G06F 3/04842 |
| | | | 345/173 |
| 2011/0153186 A1* | 6/2011 | Jakobson | G01C 21/20 |
| | | | 701/532 |
| 2013/0088600 A1* | 4/2013 | Wu | G08G 1/054 |
| | | | 348/149 |
| 2014/0220966 A1* | 8/2014 | Muetzel | H04W 4/024 |
| | | | 455/426.1 |
| 2016/0191795 A1* | 6/2016 | Han | B60R 1/00 |
| | | | 348/36 |
| 2016/0277911 A1* | 9/2016 | Kang | H04B 1/3822 |
| 2017/0084174 A1* | 3/2017 | Suzuki | B60W 30/00 |
| 2017/0132922 A1* | 5/2017 | Gupta | G06F 3/0482 |
| 2017/0132923 A1* | 5/2017 | Li | G08G 1/0112 |
| 2017/0243485 A1* | 8/2017 | Rubin | H04L 67/12 |

FOREIGN PATENT DOCUMENTS

| | | |
|---|---|---|
| KR | 1020130090953 | 8/2013 |
| KR | 101612836 | 4/2016 |
| KR | 101708657 | 2/2017 |
| WO | WO2007046340 | 4/2007 |

\* cited by examiner (a)

(b)

(a)

(b)

(a)

(b)

(a)

(b)

(c)

(a)

(b)

(a)

[RESTORE TO IMAGE OF USER'S VEHICL]

(b)

(c)

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0149703, filed on Nov. 10, 2017, the contents of which are incorporated by reference herein in its entirety.

FIELD

This specification relates to a vehicle control device provided at a vehicle, and a method for controlling the vehicle.

BACKGROUND

A vehicle is an apparatus that can transport a user in a user-desired direction, and an example of the vehicle may include a car.

For convenience for a user using a vehicle, the vehicle may include various types of sensors and electronic devices. For example, Advanced Driver Assistance Systems (ADAS) and autonomous vehicles are actively under research and development.

A vehicle may include various types of lamps. For instance, the vehicle may include various vehicle lamps having a lighting function to provide visibility of articles or objects near the vehicle during driving at night, and a signaling function to notify a driving state or direction of the vehicle to other vehicles or pedestrians.

For example, the vehicle may include devices that can directly emit light using lamps such as a head lamp that emits light to a front side to ensure a driver's sight, a brake lamp that is turned on in response to operation of the brake, and turn indicator lamps that indicates a left turn or a right turn.

In some examples, a vehicle may include reflectors that can reflects light to facilitate the vehicle to be recognized from an outside of the vehicle and that are mounted on front and rear sides of the vehicle, for instance.

There are regulations and rules on installation criteria and standards of the lamps for the vehicle.

Recently, as the advanced driving assist systems (ADAS) are actively developed, development of technologies for optimizing user's convenience and safety for driving a vehicle is of interest.

Recently, as development of 5th generation mobile networks (5G) is actively ongoing, technologies to rapidly transmit and receive images between vehicles are being actively developed.

SUMMARY

One aspect of the present disclosure may be to provide a vehicle control device that outputs an image captured by another vehicle in an optimized manner, by a present vehicle, and a method for controlling a vehicle.

Another aspect of the present disclosure may be to provide a new user interface that can controls images captured by a present vehicle and another vehicle in an optimized manner, and a vehicle control device capable of controlling the vehicle.

Another aspect of the present disclosure may be to provide a vehicle control device that checks a specific event in an optimized manner, and a method for controlling a vehicle.

According to one aspect of the subject matter described in this application, a vehicle control device includes a communication unit configured to couple to a first vehicle, and at least one processor configured to (i) control, based on a preset condition being satisfied, the communication unit to enable communication between the first vehicle and a second vehicle that is different from the first vehicle, (ii) receive, through the communication unit, an image that has been captured by a camera located at the second vehicle, and (iii) control a display unit located at the first vehicle to display at least one of the received image or information related to the second vehicle.

Implementations according to this aspect may include one or more of the following features. For example, the vehicle control device may further include a sensing unit configured to detect an event, where the preset condition may include at least one of a detection of the event through the sensing unit, a receipt of information related to the event from the second vehicle through the communication unit, or a receipt of a user's request. The at least one processor may be further configured to, (i) based on the preset condition being satisfied, control the display unit to display a graphic object that is configured to be selected and that is associated with a function to output the image captured by the camera located at the second vehicle, and (ii) based on a selection of the graphic object, receive, through the communication unit, the image captured by the camera located at the second vehicle, and output the image to the display unit.

In some implementations, the second vehicle may include at least one of a vehicle that sends information related to the event, a vehicle that has captured an image of the event, a vehicle that is located at a position closest to the event among a plurality of vehicles, a vehicle that sends the image of the event to a number of vehicles among the plurality of vehicles, or a vehicle selected by a user input from among the plurality of vehicles. The sensing unit may further include a first camera located at the first vehicle, and the at least one processor may be further configured to, based on receipt of user's request through the display unit in a state in which the preset condition is not satisfied, output, to the display unit, an image captured by the first camera.

In some implementations, the at least one processor may be further configured to (i) control the display unit to display, in a first region of the display unit, the image captured by the camera located at the second vehicle, (ii) control the display unit to display, in a second region of the display unit, an information screen that allows a user to select the second vehicle that sends the image, and (iii) control the display unit to display, in a third region of the display unit, map information that includes position information of the first vehicle and the second vehicle. In some examples, the at least one processor may be further configured to, based on selection of a third vehicle through the information screen while the first region displays a first image captured by the second vehicle, control the display unit to cease display of the first image in the first region, and to display, in the first region, a second image captured by the third vehicle, where the third vehicle is different from the second vehicle.

In some implementations, the at least one processor may be further configured to, based on the first vehicle receiving the second image from the third vehicle, update, on the map information displayed in the third region, an output position of a graphic object to correspond to a position of the third vehicle. The at least one processor may be further configured to (i) control the display unit to display, in the second region, a first plurality of graphic objects that correspond to vehicles that are located within a predetermined distance from the first vehicle, (ii) control the display unit to display, in the second region, a first icon that is associated with a function configured to output a second plurality of graphic objects corresponding to vehicles that are located outside of the predetermined distance from the first vehicle; and (iii) based on a selection of the first icon in the second region, output, to the second region, a second icon that is associated with a function configured to output the first plurality of graphic objects and the second plurality of graphic objects.

In some implementations, the at least one processor may be further configured to (i) control the display unit to display, in the first region, graphic objects corresponding to a plurality of vehicles around the first vehicle, and indicators that are, respectively, overlaid on the graphic objects and that represent the plurality of vehicles, and (ii) based on selection of an indicator from among the indicators, receive, through the communication unit, an image captured by a vehicle corresponding to the selected indicator, and output the received image to the first region. The information screen may further include at least one graphic object corresponding to the second vehicle, and an indicator that is overlaid on the at least one graphic object and that represents the second vehicle. The at least one processor may be further configured to control the display unit to display event-related information.

In some implementations, the at least one processor may be further configured to (i) control the display unit to display, in the second region, a first graphic object representing a vehicle that is able to communicate with the first vehicle through the communication unit, and (ii) control the display unit to display, in the second region, a second graphic object representing a vehicle that is unable to communicate with the first vehicle through the communication unit, where the first graphic object and the second graphic object are displayed in the information screen and have different appearances. In some examples, the at least one processor may be further configured to, (i) based on selection of the first graphic object, receive, through the communication unit, an image captured by a vehicle corresponding to the first graphic object, and display the received image in the first region, and (ii) based on selection of the second graphic object, output, to the display unit, notification information that indicates that the communication unit is unable to receive an image captured by a vehicle corresponding to the second graphic object.

In some implementations, the at least one processor may be further configured to, based on a detection of an external device that is configured to connect to the communication unit, display, in the second region, a graphic object representing the external device. In some examples, the at least one processor may be further configured to execute a messenger application that is configured to enable the communication unit to communicate with other vehicles that have detected the event. In some examples, the at least one processor may be further configured to, based on receipt of an image of an event from the second vehicle through the communication unit, change display of the information screen in the second region according to a time lapse of the event.

In some implementations, the at least one processor may be further configured to (i) output, to the second region, a first plurality of graphic objects that correspond to vehicles from which the first vehicle receives images configured to be output to the first region, and (ii) output, to the second region, a second plurality of graphic objects that correspond to vehicles from which the first vehicle does not receive an image, where the first plurality of graphic objects and the second plurality of graphic objects are displayed in the information screen and have different appearances. In some examples, the at least one processor may be further configured to determine a type of an image that is output to the first region based on a preset type that has been received through a user interface device or the display unit.

According to another aspect, a vehicle includes a plurality of wheels, a power source configured to drive at least one of the plurality of wheels, and a vehicle control device. The vehicle control device includes a communication unit, and at least one processor that is configured to (i) control, based on a preset condition being satisfied, the communication unit to enable communication between the vehicle and a second vehicle that is different from the vehicle, (ii) receive, through the communication unit, an image that has been captured by a camera located at the second vehicle, and (iii) control a display unit located at the vehicle to display at least one of the received image or information related to the second vehicle.

The implementation of the present disclosure may have one or more of the following advantages.

For example, the present disclosure may provide a vehicle control device capable of allowing a user's vehicle to check an image captured by a camera of another vehicle in real time.

In some examples, the present disclosure may provide a new user interface capable of informing a user of a cause of a vehicular congestion by using an image captured by another vehicle.

In some examples, the present disclosure may provide a vehicle control device capable of determining/changing another vehicle which provides an image in an optimized manner, and a method for controlling a vehicle.

Further scope of applicability of the present application will become more apparent from the detailed description given hereinafter. However, it should be understood that the detailed description and specific examples, while indicating exemplary implementations of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary implementations and together with the description serve to explain the principles of the disclosure.

DETAILED DESCRIPTION

A vehicle may include any type of vehicles including but not limited to cars, motorcycles, and the like. Hereinafter, the vehicle will be described based on a car.

For example, the vehicle may include an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
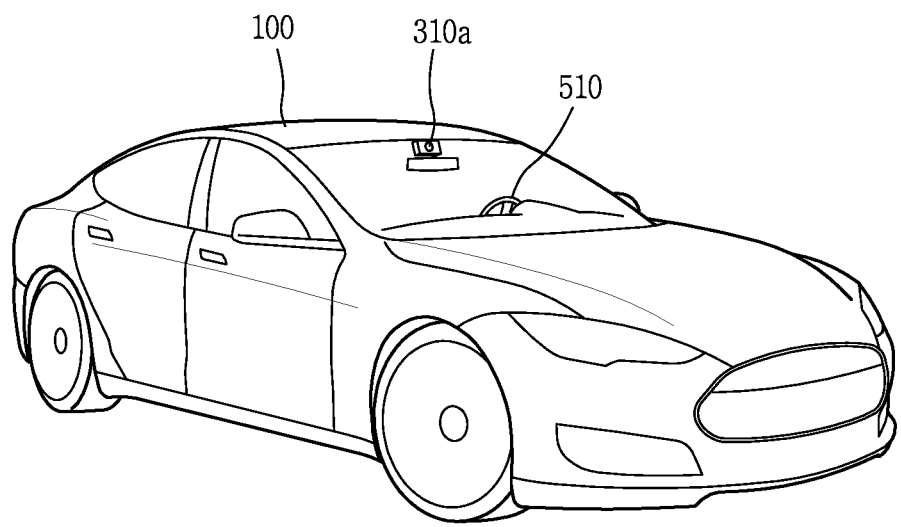
FIG. 1 is a view illustrating an example appearance of an example vehicle.
Figure 1:
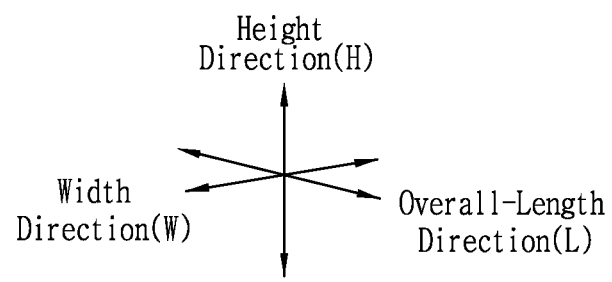

FIG. 1 illustrates an example appearance of an example vehicle.

Figure 2:
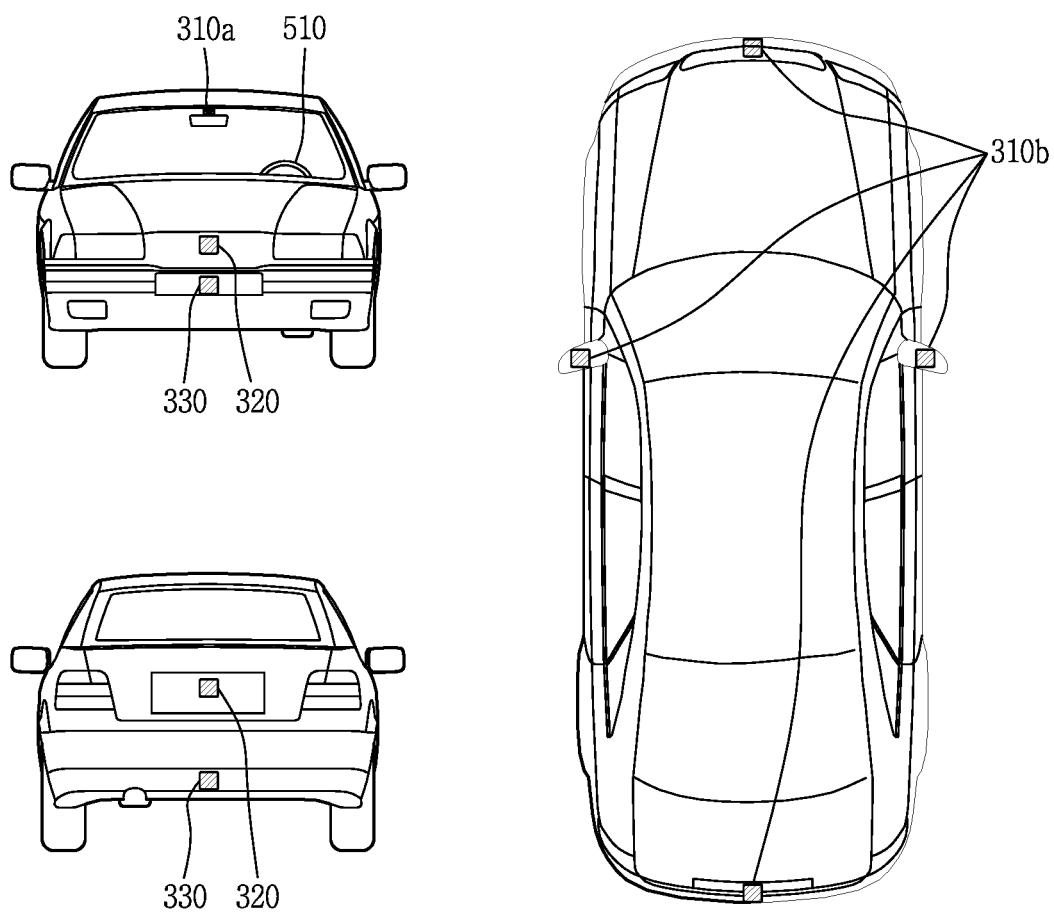
FIG. 2 is a view illustrating an example vehicle at various angles.

FIG. 2 illustrates example appearances of an example vehicle at various angles.

Figure 3:
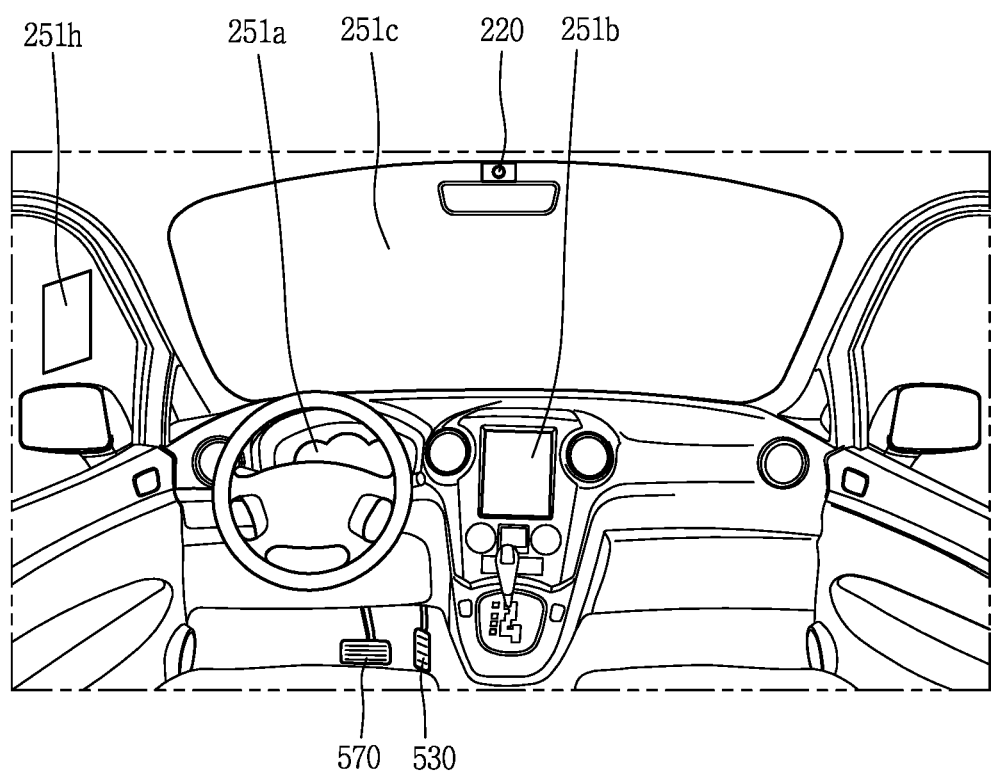
FIGS. 3 and 4 are views illustrating example interiors of an example vehicle.
Figure 4:
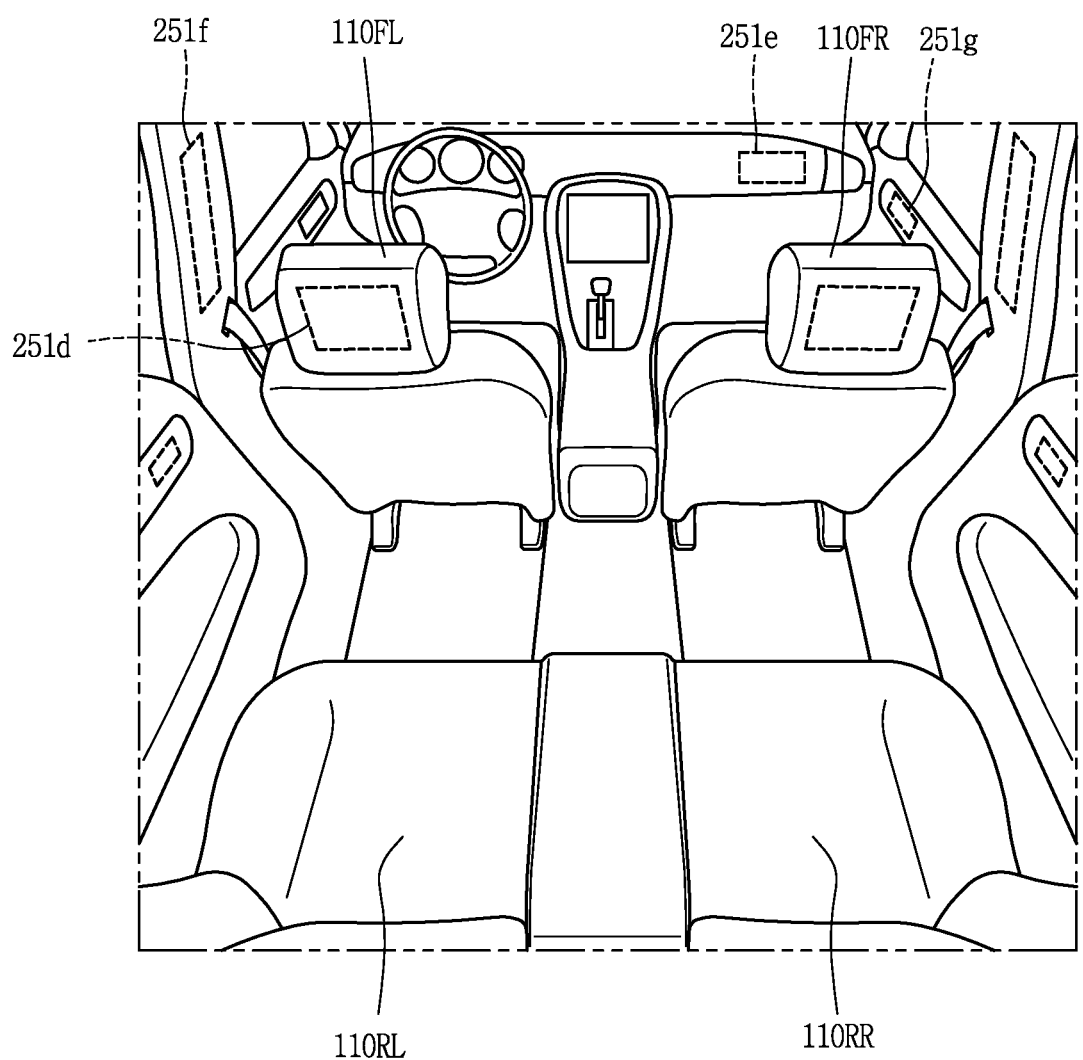

FIGS. 3 and 4 illustrate example interiors of an example vehicle.

Figure 5:
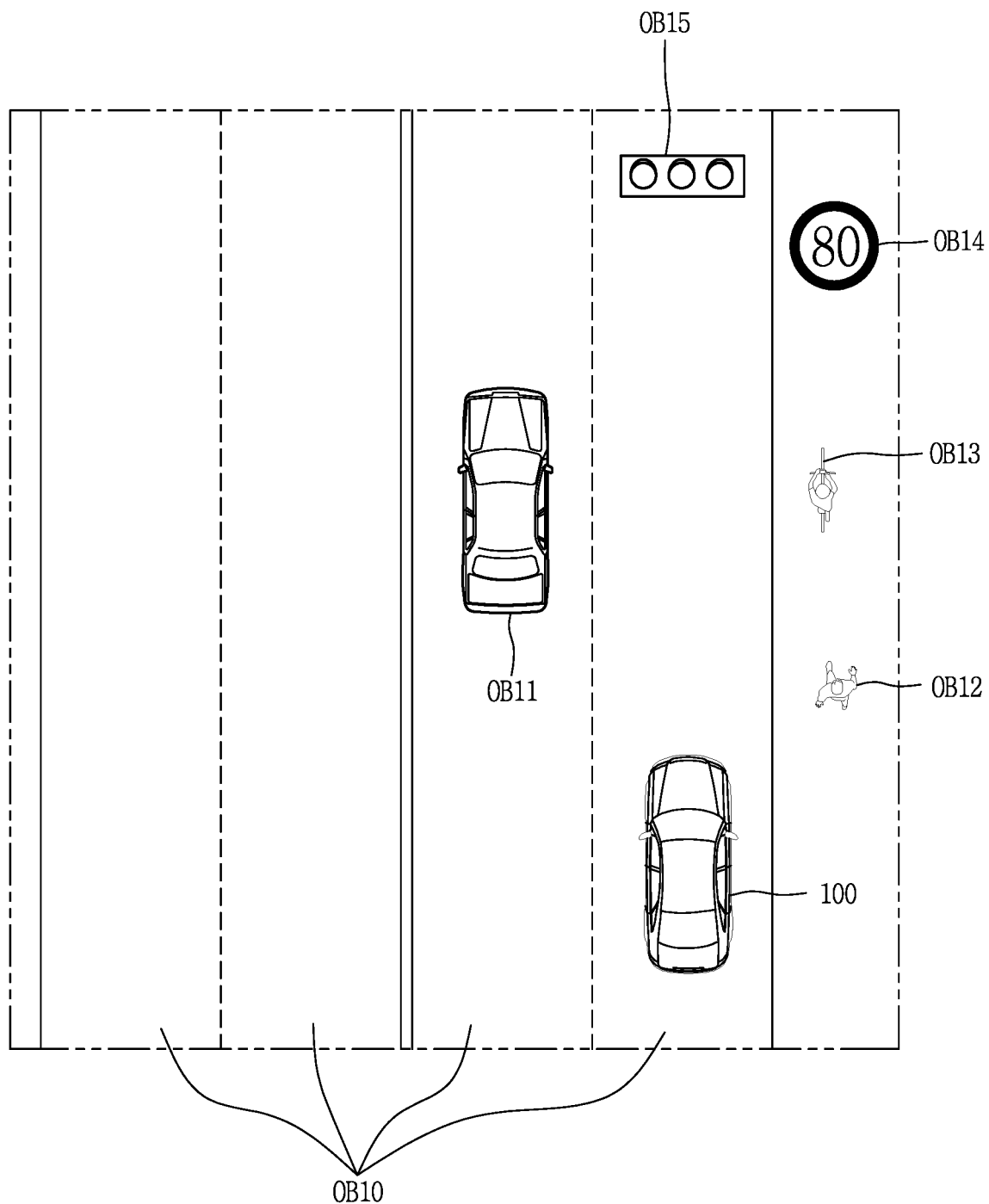
FIGS. 5 and 6 are views illustrating example objects around an example vehicle.
Figure 6:
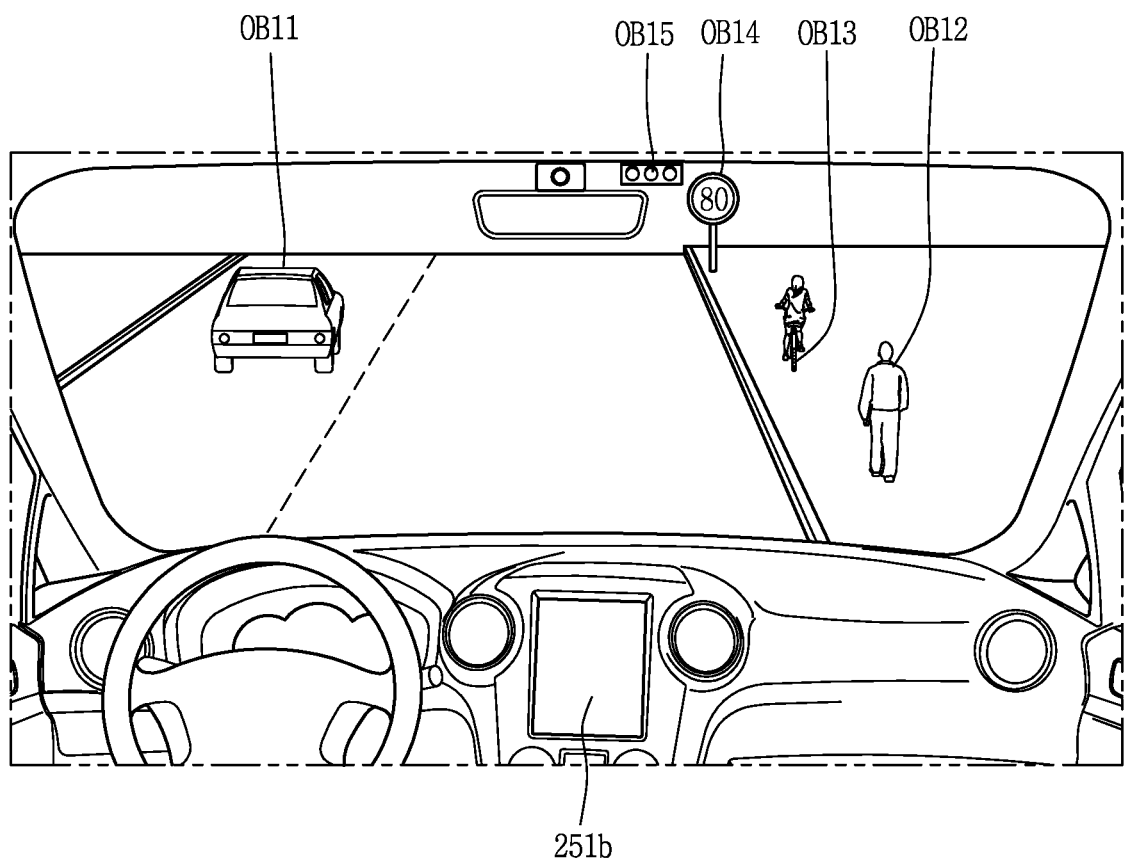

FIGS. 5 and 6 illustrate example objects around an example vehicle.

Figure 7:
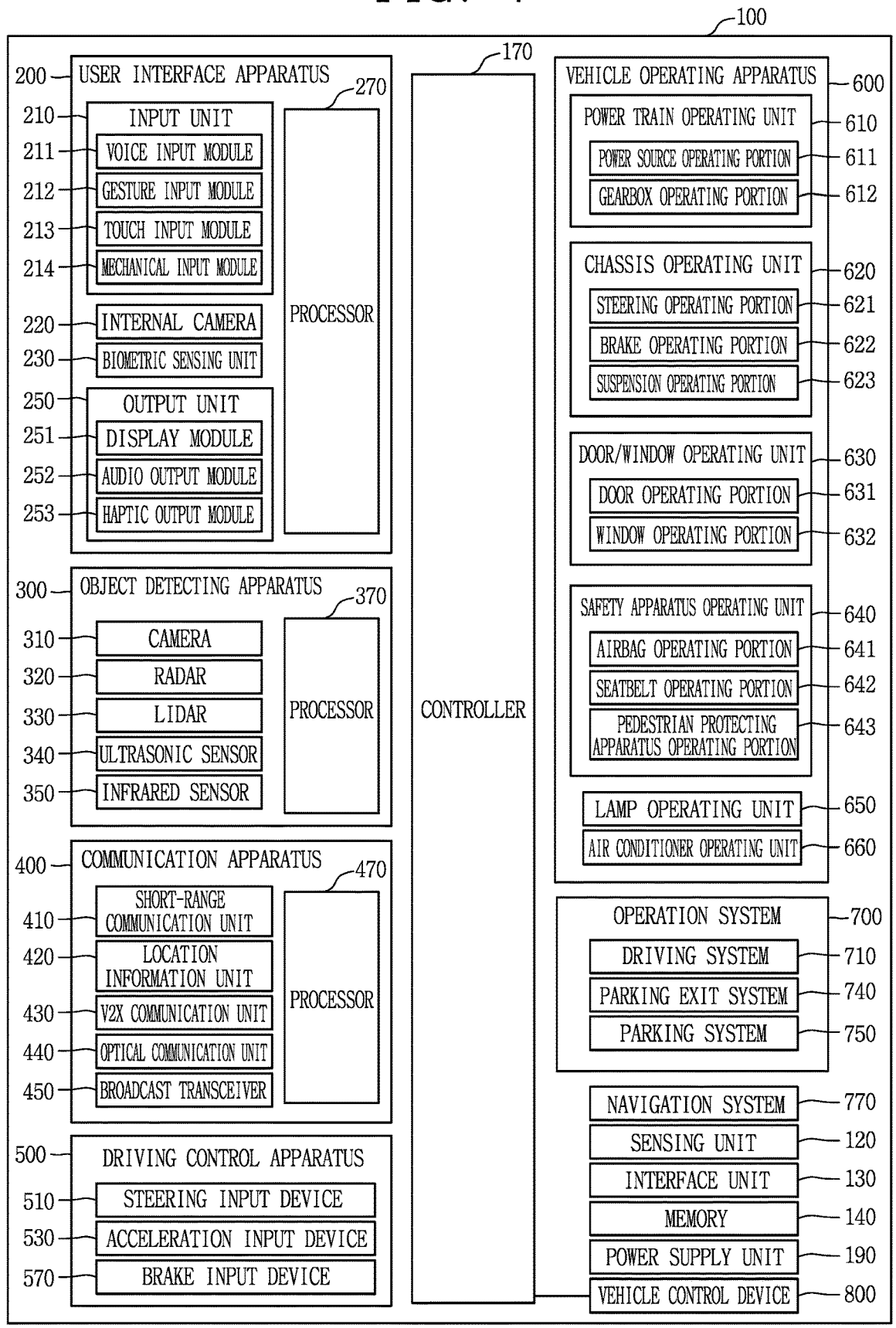
FIG. 7 is a block diagram illustrating example components of an example vehicle.

FIG. 7 is a block diagram illustrating example components of an example vehicle.

As illustrated in FIGS. 1 to 7, a vehicle 100 may include wheels turning by a driving force, and a steering device 510 configured to adjust a driving direction of the vehicle 100.

The vehicle 100 may include an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

In some implementations, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

In some implementations, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In some examples, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

In some implementations, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some examples, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some examples, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

In some implementations, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

In some implementations, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

In some implementations, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

In some implementations, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some examples, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 may be configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 may be configured in the form of a pedal. According to some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

In some implementations, the vehicle operating apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some examples, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some examples, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some examples, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

In some implementations, the operation system 700 may further include other components in addition to components to be described, or may not include some of the components to be described.

In some examples, the operation system 700 may include a processor. Each unit of the operation system 700 may individually include a processor.

In some examples, the operation system may be a sub concept of the controller 170 when it is implemented in a software configuration.

In some examples, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

In some implementations, the navigation system 770 may update pre-stored information by receiving information from an external device through the communication apparatus 400.

In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some examples, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power for operation of each component according to the control of the controller 170. For example, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some examples, the vehicle 100 according to the present disclosure may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, components of the vehicle control device 800 according to an implementation of the present disclosure will be explained in more detail with reference to the attached drawings.

Figure 8:
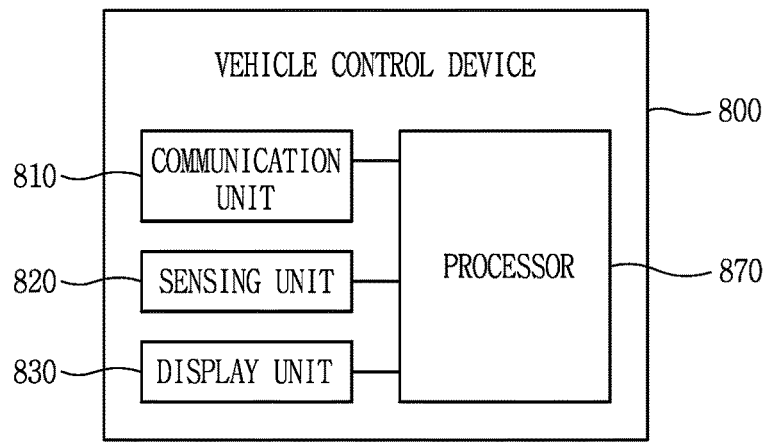
FIG. 8 is a conceptual view illustrating an example vehicle control device.

FIG. 8 is a conceptual view for explaining the vehicle control device according to an implementation of the present disclosure.

The vehicle control device according to an implementation of the present disclosure may include a communication unit 810, a sensing unit 820, a display unit 830, a processor 870, etc.

First of all, the vehicle control device 800 according to the present disclosure may include the communication unit 810.

The communication unit 810 may be the aforementioned communication apparatus 400. The communication unit 810 may be connected with a mobile terminal existing within the vehicle 100, for communication.

The communication apparatus 400 may perform communication with all devices which can perform communication (e.g., a mobile terminal, a server, a vehicle, an infra, etc.). This may be referred to as vehicle to everything (V2X) communication.

The communication apparatus 400 may perform communication with a surrounding vehicle (or another vehicle). This may be referred to as vehicle to vehicle (V2V) communication. The V2V communication may be defined as a technology to transmit and receive information between vehicles, which can share a position of a nearby vehicle, speed information, etc.

V2I communication may be defined as a technology to exchange or share information such as a traffic situation, with communicating with an infra installed on a road (e.g., a road side unit (RUS)) while driving.

The V2P communication may be defined as a technology to exchange or share information such as traffic information, traffic surrounding information, and vehicle driving information, while the vehicle and a user (e.g., pedestrian)'s mobile terminal communicate with each other.

For instance, the vehicle control device 800 (or the vehicle 100) and a mobile terminal may be connected to each other so as to perform wireless communication through the communication unit 810. The vehicle control device 800 and the mobile terminal may be wirelessly connected to each other so as to perform wireless communication by a user's request. Alternatively, in a case that the vehicle control device 800 (or the vehicle 100) and a mobile terminal have been connected to each other so as to perform wireless communication, if the mobile terminal enters the inside of the vehicle, they may be wirelessly connected to each other.

The vehicle control device 800 may control the mobile terminal through the communication unit 810.

The vehicle control device 800 may perform communication with an external device which exists outside the vehicle (e.g., a server, a cloud server (or a cloud), a mobile terminal, the Internet, another vehicle, etc.). Alternatively, the communication unit 810 may perform communication with another vehicle.

For example, the communication unit 810 may be connected to an external device which exists outside the vehicle so as to perform communication. The external device may include all types of communication devices which exist outside the vehicle and which can perform communication. In this specification, it will be explained that the external device is a road side unit (RSU) server installed near a road, the Internet, a cloud server, a mobile terminal or another vehicle, etc.

For instance, if the communication unit 810 is connected to another vehicle so as to perform communication, the vehicle control device 800 may control the second vehicle through the communication unit 810. The controlling the second vehicle may include obtaining a control right of another vehicle. For instance, the controlling the second vehicle may include controlling a driving state of another vehicle (e.g., a speed, a driving direction, a steering angle, etc.).

If the vehicle is connected to another vehicle through the communication unit 810, the processor 870 may receive or transmit information (or an image, data, a control signal, etc.) from or to the second vehicle.

The vehicle control device 800 may include a sensing unit 820. The sensing unit 820 may be an object detecting apparatus 300 explained with reference to FIG. 7, or may be the sensing unit 120 provided at the vehicle 100.

The sensing unit 820 may be implemented by combining at least two of the camera 310, the radar 320, the LiDAR 330, the ultrasonic sensor 340, the infrared sensor 350, and the sensing unit 120 included in the object detecting apparatus 300.

The sensing unit 820 may sense information related to the vehicle 100 of the present disclosure.

The information related to the vehicle may be at least one of vehicle information (or a driving state of the vehicle) and surrounding information of the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (an autonomous driving mode or a manual driving mode), a parking mode of the vehicle (an autonomous parking mode, an automatic parking mode, a manual parking mode), whether or not a user is in the vehicle, and information related to the user (for example, whether or not the user is an authenticated user), and the like.

The surrounding information of the vehicle may be a state of a road surface (a frictional force) on which the vehicle is traveling, weather, a distance from a front-side (rear-side) vehicle, a relative speed of a front-side (rear-side) vehicle, a curvature of a curve when a driving lane is the curve, an ambient brightness of the vehicle, information associated with an object existing in a reference region (a predetermined region) based on the vehicle, whether or not an object enters (or leaves) the predetermined region, whether or not a user exists around the vehicle, and information associated with the user (for example, whether or not the user is an authenticated user), and the like.

Furthermore, the surrounding information (or surrounding environment information) of the vehicle may include external information of the vehicle (for example, an ambient brightness, a temperature, a position of the sun, information on a nearby subject (a person, another vehicle, a sign, etc.), a type of a driving road surface, a terrain feature, line information, driving lane information), and information for an autonomous driving/autonomous parking/automatic parking/manual parking mode.

In addition, the surrounding information of the vehicle may further include a distance from an object existing around the vehicle to the vehicle 100, a type of the object, a parking space for the vehicle, an object for identifying the parking space (for example, a parking line, a string, another vehicle, a wall, etc.), and the like.

Further, the surrounding information of the vehicle may further include a distance between the vehicle 100 and an external device connected to the vehicle for communication (e.g., an RSU or another vehicle), a relative speed between the vehicle 100 and the external device, a speed of the vehicle 100, a speed of another vehicle, etc.

Information related to the vehicle sensed through the sensing unit 820 may be used in an autonomous driving mode for autonomous driving of the vehicle. For example, the processor 870 may allow the vehicle to perform an autonomous driving using information related to the vehicle sensed through the sensing unit 820.

The sensing unit 820 may sense a relative distance (or a relative position) between another vehicle and the vehicle, or may sense a position of an external device which exists outside the vehicle.

The sensing unit 820 may include a camera. The camera may be the camera 310 included in the aforementioned object detecting apparatus 300.

For instance, the camera 310 may be installed in the vehicle to capture a front side of the vehicle.

The vehicle control device 800 according to the present disclosure may include a display unit 830.

The display unit 830 included in the vehicle control device 800 according to the present disclosure is a display device provided in the vehicle 100, and may be the aforementioned display module 251.

The display unit 830 may be the output unit 250 or the display module 251 aforementioned with reference to FIG. 7. And the display unit 830 may include an output unit (e.g., a touch screen) of a mobile terminal which can perform communication with the communication apparatus 400.

The display unit 830 may include a transparent display. The transparent display may be attached to a windshield or a window.

The display unit 830 may be disposed on one area of a steering wheel, one area 251a, 251b, 251e of an instrument panel, one area 251d of a seat, one area 251f of each pillar, one area 251g of a door, one area of a center console, one area of a headlining or one area of a sun visor, or may be implemented on one area 251c of a windshield or one area 251h of a window.

For instance, the display unit 830 may include a cluster, a center information display (CID), a navigation device, a head-up display (HUD), and the like.

The display unit 830 may be inter-layered or integrated with a touch sensor to implement a touch screen. The touch screen may function as an input unit 210 that provides an input interface between the vehicle 100 (or the vehicle control device 800) and a user, and may provide an output interface between the vehicle 100 (or the vehicle control device 800) and the user.

The processor 870 may display various information related to the vehicle on the display unit 830. In addition, the processor 870 may display information related to the vehicle on a different position of the display unit 830 according to a type of the information related to the vehicle.

Various information displayed on the display unit 830 will be described later in detail with reference to the accompanying drawings.

The display unit 830 may be a navigation system 770 (or a navigation device). Furthermore, the display unit 830 may include the navigation system 770.

In some examples, the display unit 830 may include a navigation device provided in the vehicle 100, and the navigation device may be integrated into the vehicle 100 from the shipment of the vehicle 100 or may be a navigation device mounted by a user.

The display unit 830 may include a navigation system for a vehicle, and may include a navigation system independent from a navigation system provided in a mobile terminal 900.

An image (e.g., a preview image) received from another vehicle or an external device through the communication unit may be output to the display unit 830. Alternatively, an image (e.g., a preview image) received (captured) through the camera 310 included in the sensing unit 820 may be output to the display unit 830.

The preview image is an image received through the camera 310, and may be an image processed in real time through the camera before being captured.

For instance, since the preview image is in a state before an image is captured, it may be changed if a position of the camera is changed, or if an object which exists within a view angle of the camera moves.

The description of the display unit 830 in this specification may be applied to the navigation system 770, the navigation apparatus or the vehicle navigation system in the same or similar manner.

Furthermore, the vehicle control device 800 according to the present disclosure may include the processor 870 which can control the communication unit 810, the sensing unit 820, the display unit 830, etc.

The processor 870 may be the controller 170 described with reference to FIG. 7.

The processor 870 may control the constituent elements described in FIG. 7 and the constituent elements described in FIG. 8.

In addition, the processor 870 may control the communication unit 810 to be connected to another vehicle so as to perform communication, if a preset condition is satisfied. And the processor 870 may receive an image captured by a camera provided at the second vehicle (i.e., an image (a preview image) captured by another vehicle), through the communication unit 810.

And the processor 870 may control the display unit 830 to display at least one of the received image, and information related to the second vehicle which has sent the image.

Hereinafter, will be explained the vehicle control device capable of outputting an image captured by another vehicle or an image captured by the present vehicle in an optimum manner, and a method for controlling the vehicle.

Figure 9:
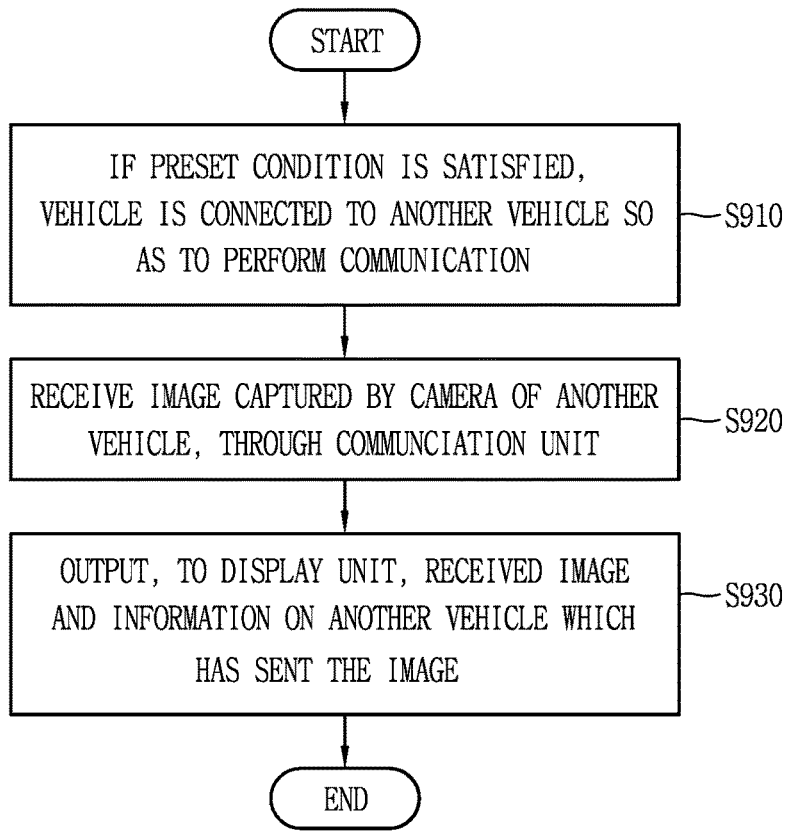
FIG. 9 is a flowchart illustrating an example control method.
Figure 10:
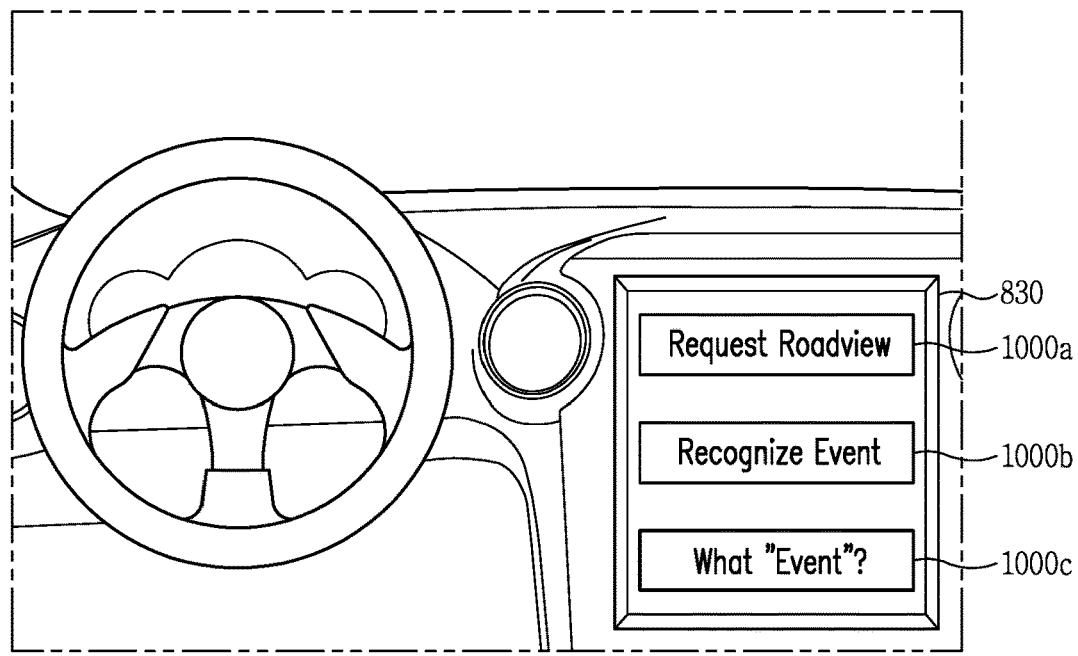
FIG. 10 is a conceptual view illustrating the control method shown in FIG. 9.
Figure 10:
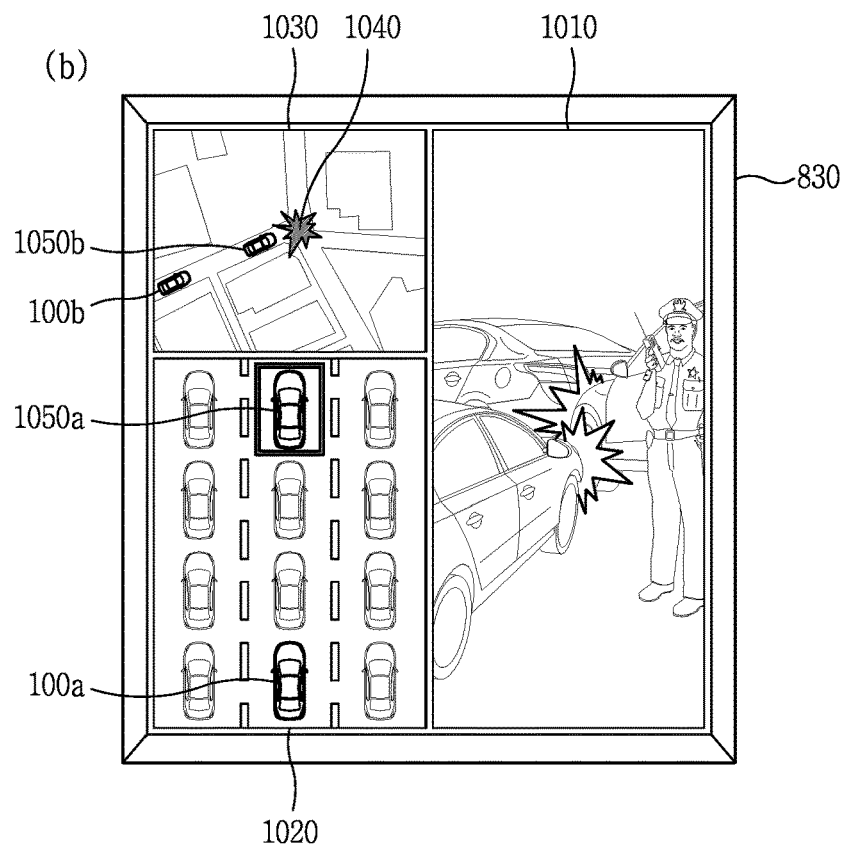

FIG. 9 is a flowchart for explaining a representative control method according to the present disclosure, and FIG. 10 is a conceptual view for explaining the control method shown in FIG. 9.

If the vehicle is stopped while driving, or if the vehicle is stopped with an unknown reason, a driver may want to know the reason why the vehicle has been stopped. In the present disclosure, may be provided an optimum user interface capable of providing a reason of a road congestion to a user by receiving and outputting an image captured by another vehicle.

Referring to FIG. 9, if a preset condition is satisfied, the vehicle may be connected to another vehicle so as to perform communication (S910).

For example, the processor 870 may control the communication unit 810 to be connected to another vehicle (or an external device) so as to perform communication, if a preset condition is satisfied.

The preset condition may include at least one of sensing a specific event through the sensing unit 820, receiving information related to the specific event from the second vehicle through the communication unit 810, and receiving a user's request.

The specific event may be understood as an abnormal situation. For instance, the specific event may include a vehicle accident, a road construction, a vehicle stopping due to a malfunction, a jaywalking, a road blocking, a group bicycle riding, etc. Especially, the specific event may include all types of events which cause a road congestion.

Then, in the present disclosure, an image captured (received) through a camera provided at another vehicle is received through the communication unit 810 (S920).

The image captured (received) through the camera provided at the second vehicle may be an image (a preview image) captured by the second vehicle. If a camera is provided at another vehicle, the second vehicle may capture a front view through the camera. Then, the second vehicle may transmit the image captured by the camera, through the communication unit 810, by request or control of the processor 870 of the vehicle.

Here, the image captured by the camera provided at the second vehicle (the image captured by the second vehicle) may be a preview image photographed (received) through the camera in real time before being captured. The processor 870 may receive the image captured by the second vehicle in real time, in a streaming manner.

In some implementations, the processor 870 may receive information related to the second vehicle. For example, the processor 870 may receive the image captured by the camera provided at the second vehicle (the image captured by the second vehicle), and information related to the second vehicle which has sent the image.

The information related to the second vehicle may include at least one of a number of the second vehicle (a unique number, numbers on a license plate, etc.), a type of the second vehicle, a color of the second vehicle, and position information of the second vehicle.

In some implementations, an image received from the second vehicle, and information related to the second vehicle which has sent the image, are output to the display unit 830.

For example, if a preset condition is satisfied, the vehicle control device 800 may be connected to the second vehicle so as to perform communication. Then, an image captured by the second vehicle, and information related to the second vehicle may be received. Then, the processor 870 may control the display unit 830 to display the received image and the information related to the second vehicle which has sent the image.

For instance, as shown in FIG. 10(*a*), if the preset condition is satisfied, the display unit 830 may display a graphic object 1000*c* associated with a function to output an image captured by the camera provided at the second vehicle (an image captured by the second vehicle).

Then, if the graphic object 1000*c* is selected, the processor 870 may receive the image captured by the camera provided at the second vehicle (the image captured by the second vehicle) through the communication unit 810, and then may output the image to the display unit 830.

The second vehicle which sends the image may include at least one of a vehicle which sends information related to a specific event, a vehicle which captures the specific event, a vehicle disposed at a position closest to the specific event among other vehicles, a vehicle which sends an image the most, and a vehicle selected based on a user input.

The display unit 830 may further display a graphic object 1000*a* associated with a function to output an image captured by the camera included in the sensing unit 820, and a graphic object 1000*b* associated with a function to sense a specific event by using at least one of the communication unit 810 and the sensing unit 820.

A condition to output the graphic objects 1000*a*, 1000*b*, 1000*c* to the display unit 830 may include sensing a specific event by the aforementioned preset condition (e.g., sensing a specific event through the sensing unit 820, receiving information related to the specific event from the second vehicle through the communication unit 810, receiving a user's request, etc.).

Further, the graphic objects 1000*a*, 1000*b*, 1000*c* may be output to the display unit 830 based on a user's request, even if a preset condition is not satisfied.

The sensing unit 820 may include a camera disposed to capture a front side of the vehicle 100.

If a user's request is received through the display unit 830 in a state that the aforementioned preset condition is not satisfied (e.g., if a touch input is applied to the graphic object 1000*a* associated with a function to output an image captured (received) through the camera of the sensing unit 820), the processor 870 may output the image received through the camera of the sensing unit 820, to the display unit 830.

If a touch input is applied to the graphic object 1000*b* associated with a function to sense a specific event by using at least one of the communication unit 810 and the sensing unit 820, the processor 870 may scan whether there exists another vehicle which sends information related to a specific event or not through the communication unit 810, or may sense whether the specific event has occurred or not through the sensing unit 820.

If the graphic object 1000*c* associated with a function to output an image captured by the camera provided at the second vehicle is selected, the processor 870 may perform V2V communication with the second vehicle through the communication unit 810.

Then, as shown in FIG. 10(*b*), the processor 870 may receive the image captured by the second vehicle from the second vehicle, through the communication unit 810, and then may output the received image to the display unit 830.

As shown in FIG. 10(*b*), the image captured by the camera provided at the second vehicle (the image captured by the second vehicle) may be displayed on a first region 1010 of the display unit 830. Further, an image captured (received) through the camera of the sensing unit 820 may be also output to the first region 1010.

Screen information for selecting another vehicle which sends the image may be displayed on a second region 1020 of the display unit 830. And map information including a position of the present vehicle 100*b* and a position of another vehicle 1050*b* which sends the image may be displayed on a third region 1030 of the display unit 830.

The present disclosure may provide a vehicle control device and a method for controlling a vehicle, the vehicle control device capable of outputting an image captured by the present vehicle or another vehicle in an optimized manner, capable of selecting another vehicle which sends an image, or capable of immediately checking a specific event regarded as a cause of a road congestion, by using a user interface shown in FIG. 10(*b*).

Hereinafter, a user interface for outputting an image captured by the present vehicle or another vehicle in an optimized manner will be explained in more detail.

Figure 11:
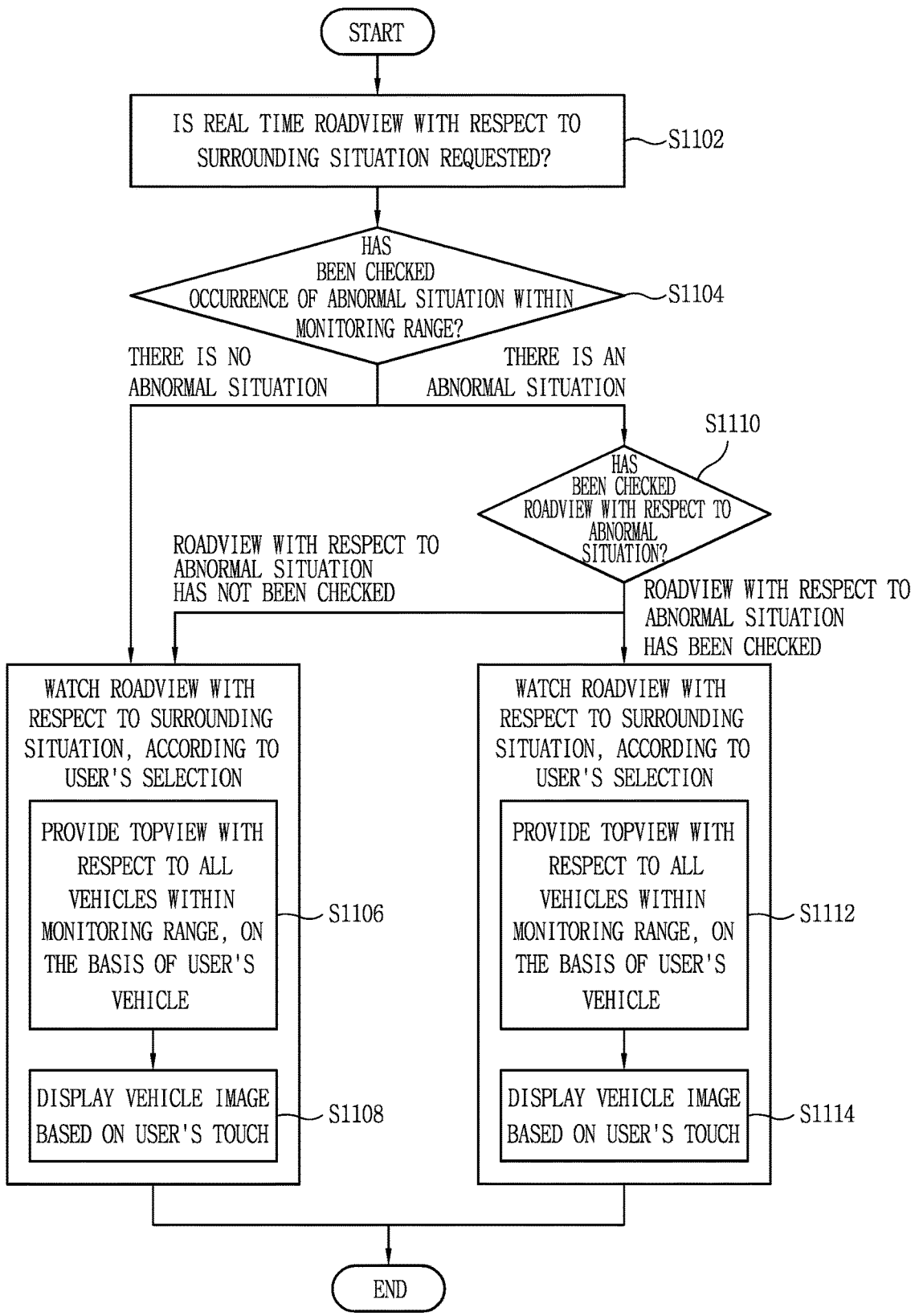
FIG. 11 is a flowchart illustrating an example control method by an example vehicle control device.

FIG. 11 is a flowchart for explaining a control method by a vehicle control device according to an implementation of the present disclosure. And FIGS. 12A~12B, 13~23, 24A~24B, and 25~27 are conceptual views for explaining a method to output an image captured by at least one of a vehicle according to an implementation of the present disclosure, and another vehicle.

Referring to FIG. 11, a real time roadview with respect to a surrounding situation is requested (S1102).

For example, the real time roadview may be an image captured by the camera of the sensing unit, or a camera provided at another vehicle (or an image captured by another vehicle).

The processor 870 may receive the request with respect to the real time roadview through at least one of the communication unit 810 and the sensing unit 820, or may receive a user input which requests the real time roadview, through the display unit 830 or a user interface device 200.

In some implementations, it may be checked whether an abnormal situation, which can be an example of a specific event, has occurred within a monitoring range (S1104).

For example, the monitoring range may be at least one of a range where communication can be performed through the communication unit 810, a sensing range of the sensing unit 820, and a range where an image can be captured by a camera.

If information related to a specific event is received from another vehicle (or an external device) through the communication unit 810, or if the specific event is sensed by the sensing unit 820, the processor 870 may determine (detect, extract or sense) that the abnormal situation has occurred.

Further, the processor 870 may determine the abnormal situation based on data collected from a nearby vehicle (or another vehicle), a base station (an external device), a pedestrian's mobile terminal, etc. As aforementioned, the abnormal situation may be an example of a specific event, and may include any other situations which interrupt a driving of a vehicle, including but not limited to a vehicle accident, a vehicle malfunction, a vehicle stopping, or a road construction.

In some implementations, if it is determined that an abnormal situation (a specific event) has not occurred within a monitoring range, a surrounding situation roadview for watching may be output according to a user's selection (or a user's request).

For example, if a user's request is received through the display unit 830 (or if a touch input is applied to the graphic object 1000a associated with a function to output an image received through the camera of the sensing unit 820), in a state that a specific event has not been detected through the communication unit 810 or the sensing unit 820, the processor 870 may output the image captured by the camera of the sensing unit 820, to the display unit 830.

The processor 870 may provide (output) a top view with respect to all vehicles which exist within a monitoring range on the basis of the present vehicle (S1106). The top view may be at least one of screen information for selecting another vehicle which sends the image (aforementioned with reference to FIG. 10(b)), or map information including a position of the present vehicle and a position of another vehicle which sends the image.

Then, the processor 870 may output a vehicle image to the display unit 830 based on a user's touch (S1108). That is, the processor 870 may control the display unit 830 in a preset manner, based on a user's touch applied in the output state of the image received through the camera.

If an abnormal situation is detected in S1104, it is checked whether to output a roadview with respect to the abnormal situation or not (S1110).

For instance, if an abnormal situation is detected, the processor 870 may determine that a preset condition has been satisfied. Accordingly, the processor 870 may output the graphic object 1000c associated with a function to output an image captured by the camera provided at the second vehicle, to the display unit 830.

If the graphic object 1000c is selected, the processor 870 may output a roadview with respect to the abnormal situation, to the display unit 830. Here, the roadview with respect to the abnormal situation may be an image captured by another vehicle.

The second vehicle may include at least one of another vehicle which sends information related to a specific event (an abnormal situation), another vehicle which captures the specific event, another vehicle disposed at a position closest to the specific event, another vehicle which sends an image the most, and another vehicle selected based on a user input.

The processor 870 may output, to the display unit, a top view with respect to a nearby vehicle on the basis of an abnormal situation point (S1112).

Further, the processor 870 may output a top view based on another vehicle which captures an abnormal situation, and a roadview (an image captured by another vehicle).

Further, the processor 870 may output an image of another vehicle which captures an abnormal situation, to the display unit 830 (S1114).

Further, the processor 870 can change another vehicle which sends an image, based on a user's input received through the display unit 830 or the user interface device 200, in the output state of the image captured by the second vehicle.

If another vehicle which sends an image is changed, a view angle of an image is changed. If another vehicle is changed, an image captured by another vehicle is also changed.

Under such a configuration, the present disclosure may provide a user interface capable of outputting an image received through the camera of the sensing unit 820 of the present vehicle to the display unit 830, or receiving and outputting an image captured by another vehicle through the communication unit 810 according to a user's request, and changing an image in an optimized manner according to a user's request.

Figure 12A:
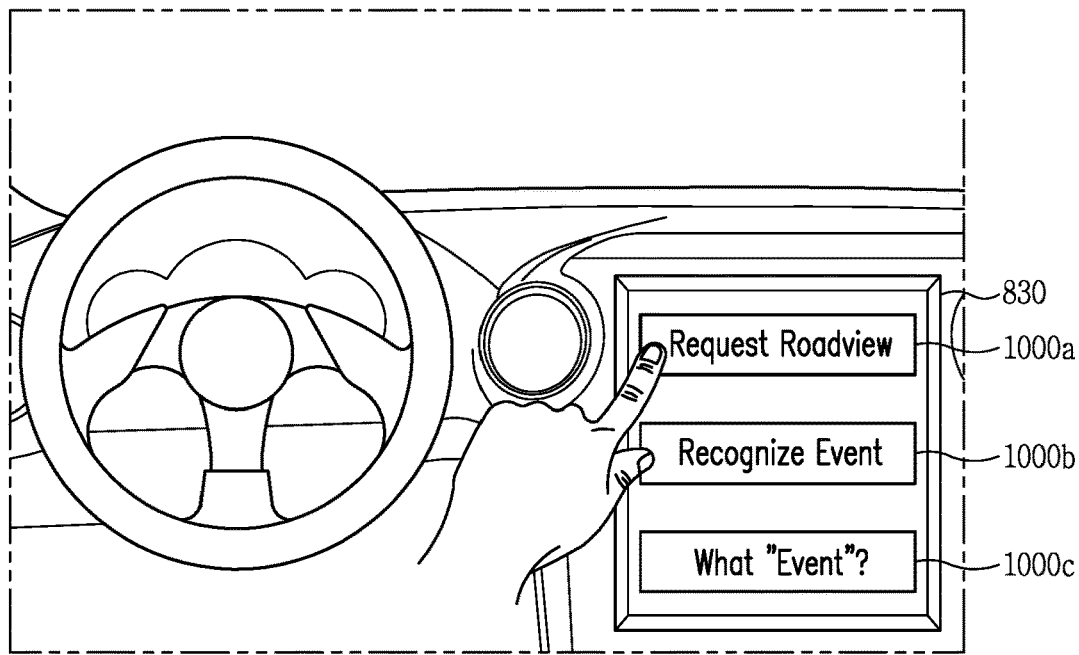
FIGS. 12A and 12B, FIGS. 13 to 23, FIGS. 24A and 24B, and FIGS. 25 to 27 are conceptual views illustrating example methods to output an image captured by at least one of an example vehicle or a second example vehicle.
Figure 12A:
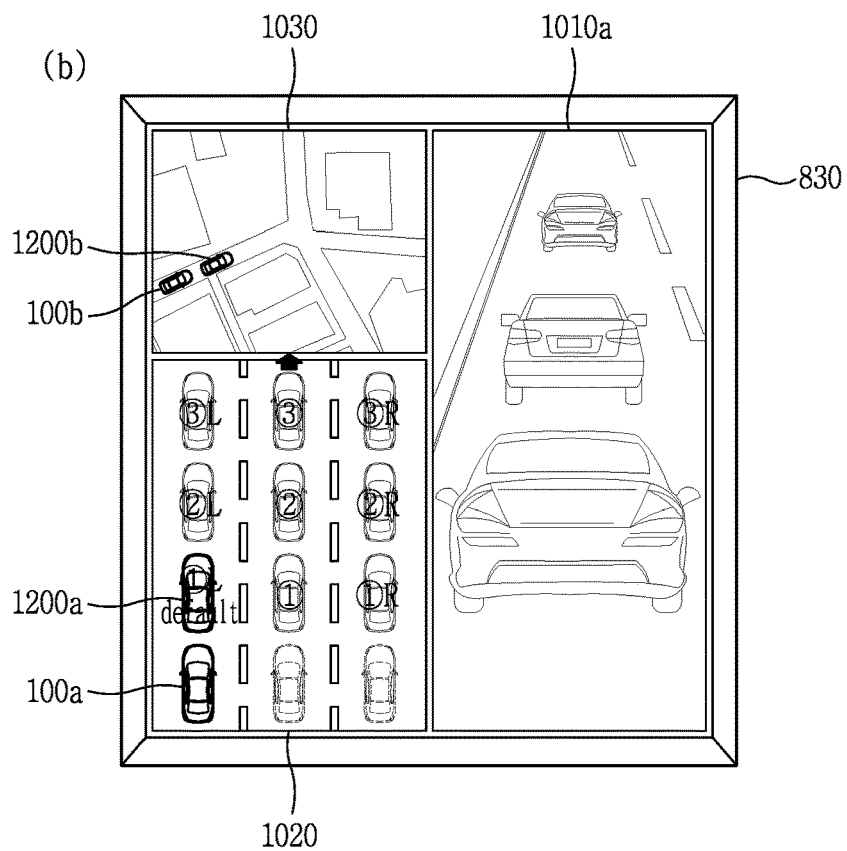

Referring to FIG. 12(a), the processor 870 may receive a roadview request through the display unit 830 (or may receive a touch input applied to the graphic object 1000a associated with a function to output an image captured by the camera of the sensing unit 820).

Figure 12B:
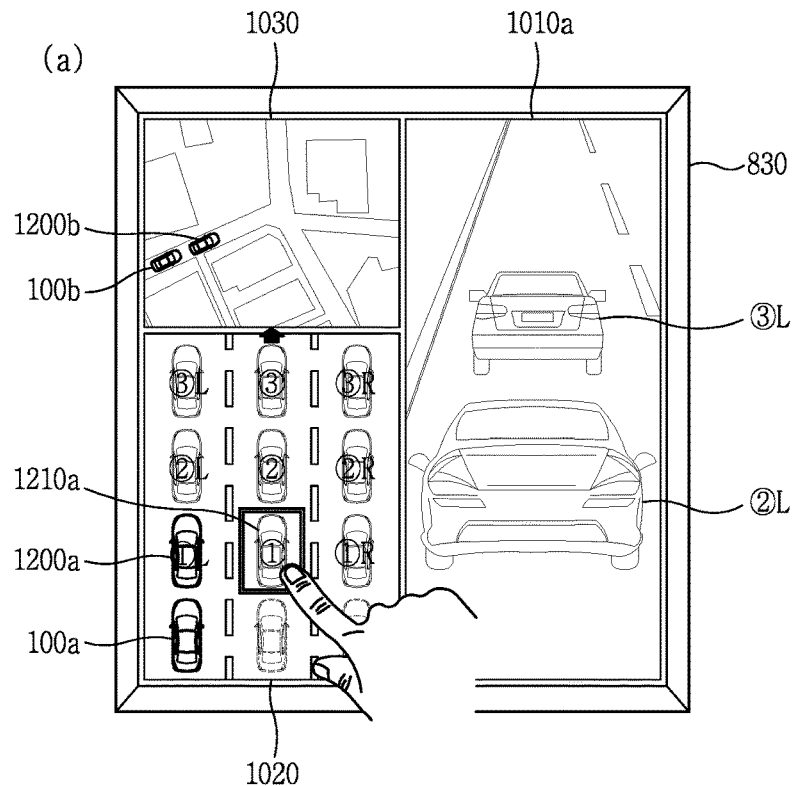
Figure 12B:
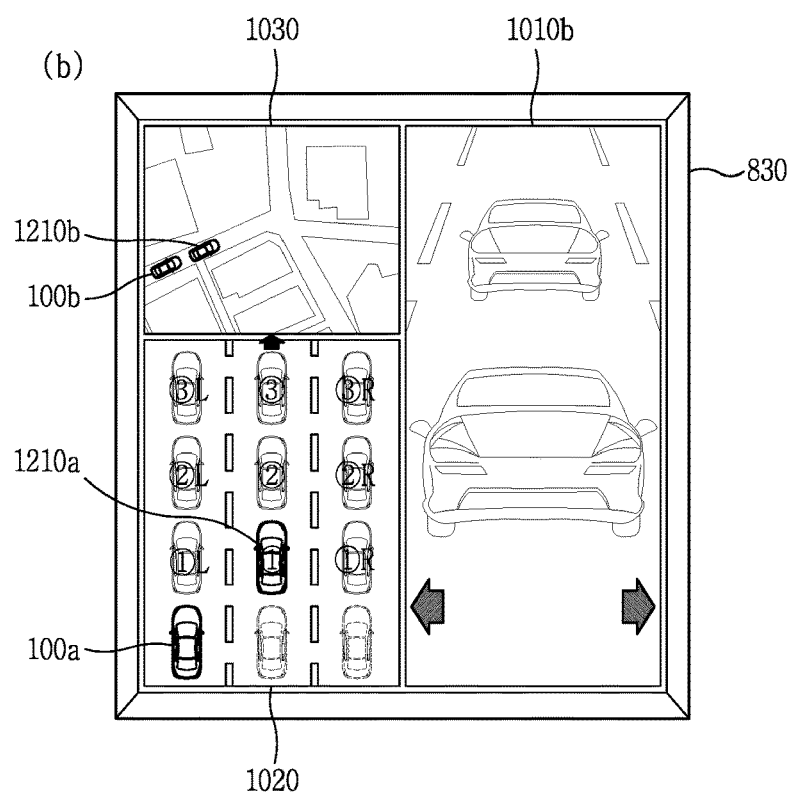

Then, as shown in FIG. 12(b), the processor 870 may output an image received through the camera to the first region 1010, and may output screen information for selecting another vehicle which sends an image to the second region 1020. And the processor 870 may output map information including a position of the present vehicle and a position of the second vehicle which sends the image, to the third region 1030.

As shown in FIG. 12(a), if a touch input is applied to the graphic object 1000a associated with a function to output an image captured by the camera of the sensing unit 820, the processor 870 may output the image received through the camera of the sensing unit 820, to the display unit 830.

If the graphic object 1000a is selected, as shown in FIG. 12(b), the processor 870 may receive an image 1010a captured by another vehicle which is the closest to the vehicle among other vehicles positioned in front of the vehicle, through the communication unit 810. Then, the processor 870 may output the received image 1010a to the first region of the display unit 830.

For instance, a graphic object associated with a roadview output may be associated with a function to receive and output an image captured by another vehicle which is the closest to the vehicle among other vehicles positioned in front of the vehicle, by default.

The processor 870 may sense a position of another vehicle through the sensing unit 820. For example, the processor 870 may sense a relative position of the vehicle with respect to another vehicle, through the sensing unit 820.

Then, the processor 870 may generate screen information displayed on the second region 1020 of the display unit 830, based on the sensed position of the second vehicle. For example, the screen information displayed on the second region 1020 may be a top view, and may include a graphic object 100*a* corresponding to the vehicle and a graphic object corresponding to another vehicle sensed through the sensing unit 820.

An output position of a graphic object corresponding to another vehicle, on the screen information, may be determined based on a relative position of the vehicle with respect to the second vehicle.

If the relative position of the vehicle with respect to the second vehicle is changed, an output position of the graphic object corresponding to another vehicle on the second region may be variable.

That is, the processor 870 may output graphic objects displayed on the second region, by reflecting the relative position of the vehicle with respect to the second vehicle in real time.

Further, in case of receiving and outputting an image captured by another vehicle through the communication unit, the processor 870 may display a graphic object 1200*a* corresponding to the second vehicle which sends the image, in a visually distinguished manner from graphic objects corresponding to other vehicles.

With such a configuration, the present disclosure may provide a user interface capable of easily checking another vehicle which sends an image being output to the display unit 830.

The present disclosure may provide a user interface capable of easily changing another vehicle which sends an image, by using screen information displayed on the second region 1020 of the display unit 830.

For instance, a first image 1010*a* captured by another first vehicle may be being output to the first region of the display unit 830.

Accordingly, the graphic object 1200*a* corresponding to said another first vehicle may be displayed on the second region of the display unit 830, in a visually distinguished manner from graphic objects corresponding to other vehicles.

As shown in FIG. 12B(*a*), while the first image 1010*a* captured by said another first vehicle is output to the first region, if another second vehicle different from said another first vehicle is selected on the second region (i.e., if a graphic object 1210*a* corresponding to said another second vehicle is selected), a second image 1010*b* captured by said another second vehicle, rather than the first image, may be output to the first region, as shown in FIG. 12B(*b*).

Accordingly, the graphic object 1210*a* corresponding to said another second vehicle may be displayed on the second region 1020, in a visually distinguished manner from graphic objects corresponding to other vehicles.

Further, if another vehicle which sends an image to the vehicle is changed (e.g., if another first vehicle is changed into another second vehicle), the processor 870 may change an output position of a graphic object 1210*b* corresponding to the second vehicle, on map information displayed on the third region.

That is, a display manner of a graphic object corresponding to another vehicle output to the second region, and an output position of a graphic object corresponding to another vehicle output to the third region may be changed based on information related to another vehicle which sends an image.

Further, since a position of another vehicle which sends an image is notified, a display manner of a graphic object corresponding to the second vehicle, and an output position of a graphic object corresponding to another vehicle output to the third region may be understood to be included in another vehicle-related information.

The vehicle control device according to the present disclosure may provide a user interface capable of changing another vehicle which sends an image, in a more intuitive manner.

Figure 13:
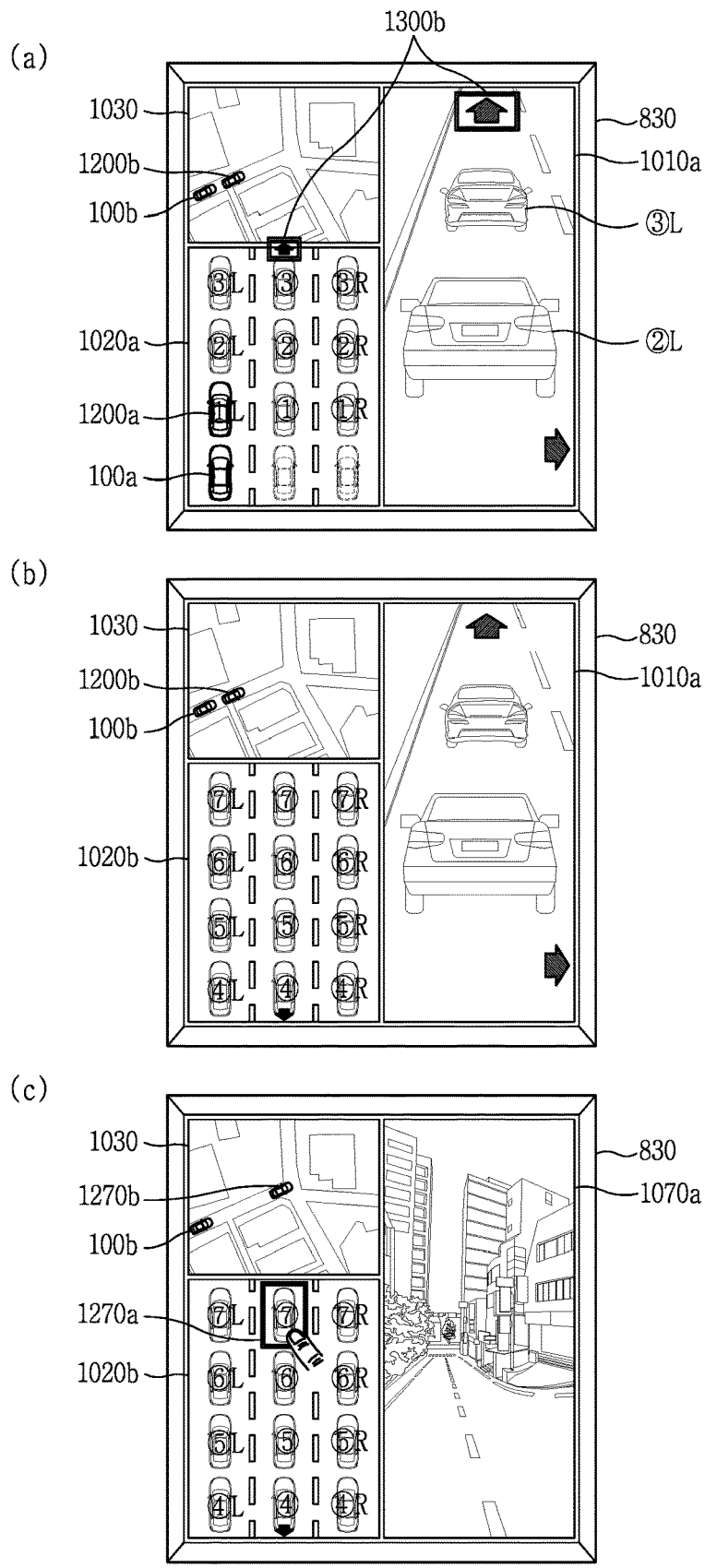

For instance, as shown in FIG. 13(*a*), graphic objects corresponding to other vehicles which exist within a predetermined distance from the vehicle may be displayed on the second region 1020 of the display unit 830. Screen information which displays the graphic objects corresponding to other vehicles which exist within a predetermined distance from the vehicle may be first screen information 1020*a*.

A first icon 1300*a* associated with a function to output graphic objects corresponding to other vehicles farther than the predetermined distance may be further displayed on the second region 1020.

If the first icon 1300*a* is selected in the output state of the first screen information 1020*a*, as shown in FIG. 13(*b*), the processor 870 may output, to the second region, a second icon 1300*b* associated with a function to output graphic objects corresponding to other vehicles farther than the predetermined distance and graphic objects corresponding to other vehicles which exist within the predetermined distance.

Here, screen information including the graphic objects corresponding to other vehicles farther than the predetermined distance may be second screen information 1020*b*.

That is, if the first icon 1300*a* is selected in the output state of the first screen information 1020*a*, the processor 870 may change the first screen information 1020*a* into the second screen information 1020*b*, and may output the second icon 1300*b* rather than the first icon 1300*a* to the second region.

Then, if one graphic object 1270*a* is selected from the graphic objects corresponding to other vehicles farther than the predetermined distance, the processor 870 may receive an image 1070*a* captured by another vehicle corresponding to the selected graphic object 1270*a*, from the second vehicle, through the communication unit 810. Then, the processor 870 may output the received image 1070*a* to the first region of the display unit 830.

As shown in FIG. 13(*c*), if another vehicle which sends an image to the present vehicle is changed, the processor 870 may change an output position of a graphic object 1270*b* corresponding to the second vehicle, on the map information displayed on the third region 1030.

As shown in FIG. 13(*a*), on the first region 1010 which displays an image captured by the camera, information indicating other vehicles (e.g., ②L, ③L, etc.) may be displayed on images indicating said other vehicles, in an overlapped manner.

If the information is selected, the processor 870 may receive an image captured by another vehicle corresponding to the information through the communication unit 810, and may output the received image to the first region. That is, the processor 870 may change another vehicle which sends an image, based on a touch input applied to one of the information indicating other vehicles.

As shown in FIG. 13, screen information displayed on the second region may include at least one graphic object corresponding to another vehicle, and information indicating other vehicles (e.g., ①, ①L, ①R, ..., ⑦, ⑦L, ⑦R) may be displayed on the at least one graphic object.

Information displayed on the first region and information displayed on the second region may correspond to each other.

On the first region of the display unit 830, icons 1300*c*, 1300*d* associated with a function to change another vehicle which sends an image may be further displayed in an overlapped manner.

If the icons 1300*c*, 1300*d* are selected, the processor 870 may change another vehicle which sends an image. For instance, if the icon 1300*c* indicating an upward arrow is selected, the processor 870 may receive an image from another vehicle positioned in front of another vehicle which currently sends an image. On the other hand, if the icon 1300*c* indicating a rightward arrow is selected, the processor 870 may receive an image from another vehicle positioned on the right side of another vehicle which currently sends an image.

If another vehicle which sends an image is changed, a display manner of a graphic object displayed on the second region, and an output position of a graphic object corresponding to another vehicle displayed on the third region may be also changed.

With such a configuration, the present disclosure may provide an optimized user interface capable of easily selecting another vehicle which sends an image to the present vehicle as another vehicle disposed at a relatively long distance, and capable of more intuitively checking a relative position of the vehicle with respect to another vehicle if another vehicle which sends an image is changed.

Figure 14:
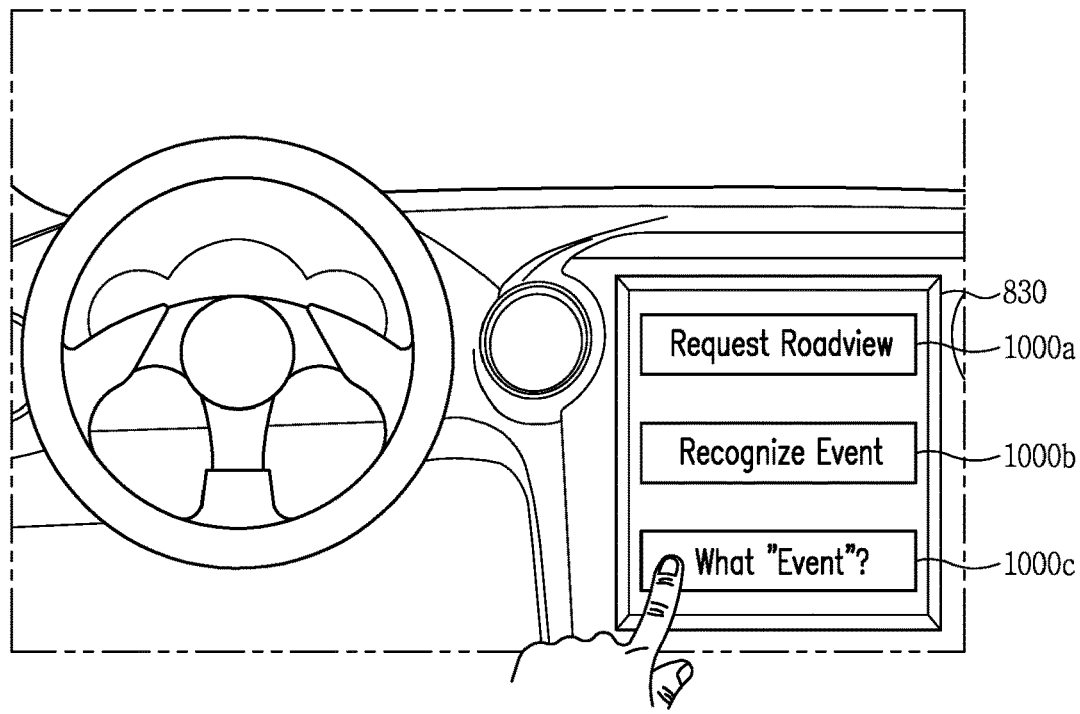
Figure 14:
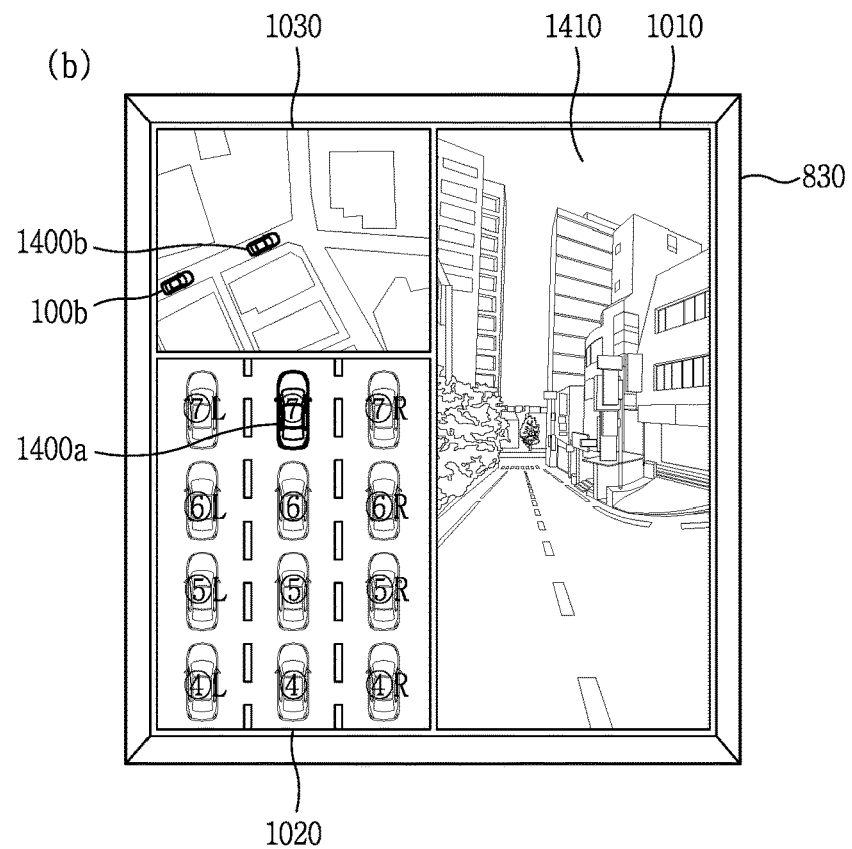

As shown in FIG. 14(*a*), if a preset condition is satisfied, the processor 870 may output, to the display unit 830, a graphic object 1000*c* associated with a function to output an image captured by another vehicle which captures a specific event.

Then, as shown in FIG. 14(*b*), if the graphic object 1000*c* is selected, the processor 870 may receive an image from another vehicle which captures a specific event, through the communication unit 810, and may output the received image to the display unit 830.

Here, the second vehicle which captures a specific event may include at least one of another vehicle which sends information related to the specific event, another vehicle which captures the specific event, another vehicle disposed at a position closest to the specific event, another vehicle which sends an image the most, and another vehicle selected based on a user input.

In this case, an image received through a camera provided at the second vehicle which captures the specific event may be displayed on the first region of the display unit 830. And a graphic object 1400*a* corresponding to the second vehicle which sends the image may be displayed on the second region, in a different manner from graphic objects corresponding to other vehicles.

Further, map information which displays a position of a graphic object 100*a* corresponding to the vehicle, and a position of a graphic object 1400*b* corresponding to the second vehicle which sends the image may be displayed on the third region.

With such a configuration, the present disclosure may provide a user interface capable of checking a specific event generated from a front side of the vehicle, through an image captured by a camera provided at another vehicle, in real time if a preset condition is satisfied, and capable of more intuitively checking a position where a specific event has occurred.

The processor 870 may sense a specific event through the communication unit 810 or the sensing unit 820.

Figure 15:
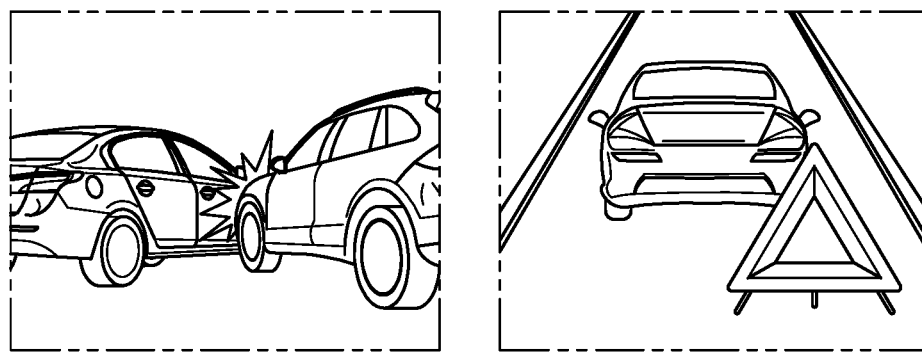
Figure 15:
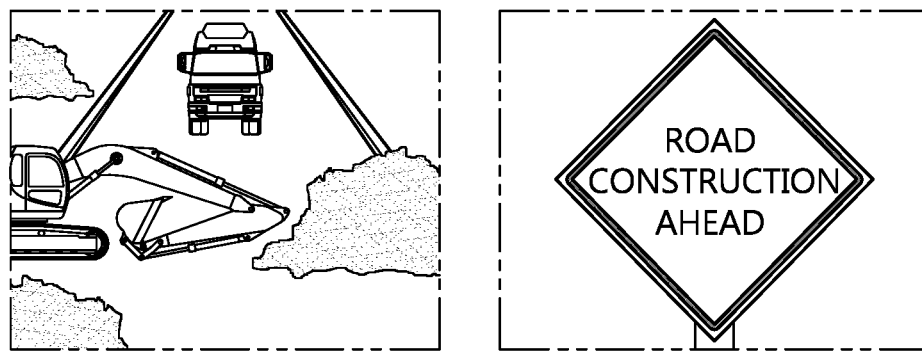
Figure 15:
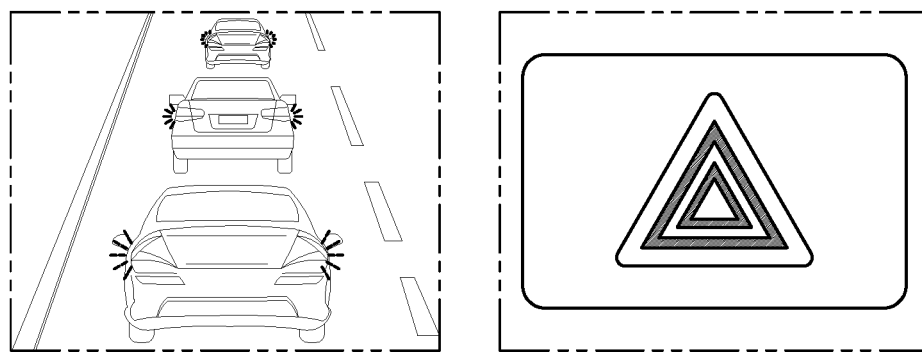

Referring to FIG. 15(*a*), the processor 870 may determine an occurrence of a specific event when a front damaged vehicle is sensed through the camera of the sensing unit 820, when there is a person on a road, or when an emergency tripod is sensed.

Referring to FIG. 15(*b*), if a construction spot is sensed from the front side through the camera of the sensing unit 820, or if a construction sign or a construction-related object is sensed, the processor 870 may sense a specific event.

Referring to FIG. 15(*c*), if it is sensed that front vehicles turn on emergency lamps, the processor 870 may sense an occurrence of a specific event.

Further, if information on a specific event is received from another vehicle through the communication unit 810, the processor 870 may sense an occurrence of a specific event.

Figure 16:
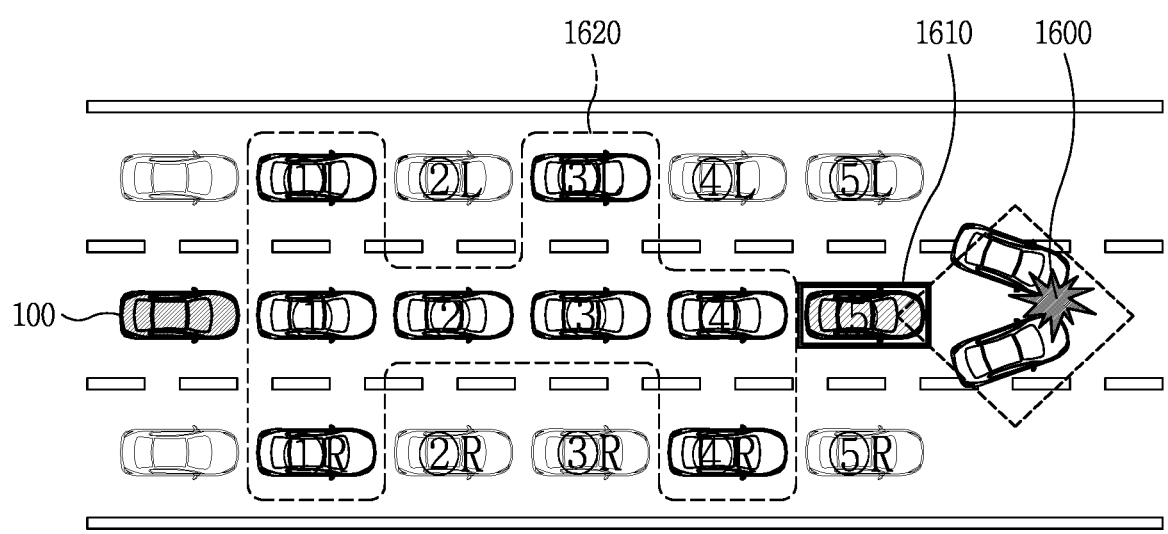

Further, as shown in FIG. 16, if a plurality of vehicles within a monitoring range view an image captured by the same vehicle 1610, the processor 870 may determine an occurrence of a specific event.

For example, the processor 870 may determine information of other vehicles which are within a monitoring range (e.g., a range where V2V communication can be performed through the communication unit 810) and which send images to other vehicles. This may be performed through V2V communication with the plurality of other vehicles which are within the monitoring range.

Then, if it is determined that a plurality of other vehicles 1620 which are within the monitoring range (e.g., more than a predetermined number of other vehicles among the plurality of other vehicles which are within the monitoring range) are outputting an image captured by another specific vehicle 1610 after receiving the image, the processor 870 may determine that a specific event 1600 has occurred from the front side of said another specific vehicle 1610.

In this case, if a graphic object 1000*c* associated with a function to output an image captured by another vehicle is selected, the processor 870 may receive the image captured by said another specific vehicle 1610 through the communication unit 810, and may output the received image to the display unit 830.

In some examples, said another specific vehicle 1610 may be another vehicle which sends an image to a largest number of other vehicles 1620 among a plurality of other vehicles which exist within a monitoring range (within a predetermined distance) on the basis of the vehicle 100.

Figure 17:
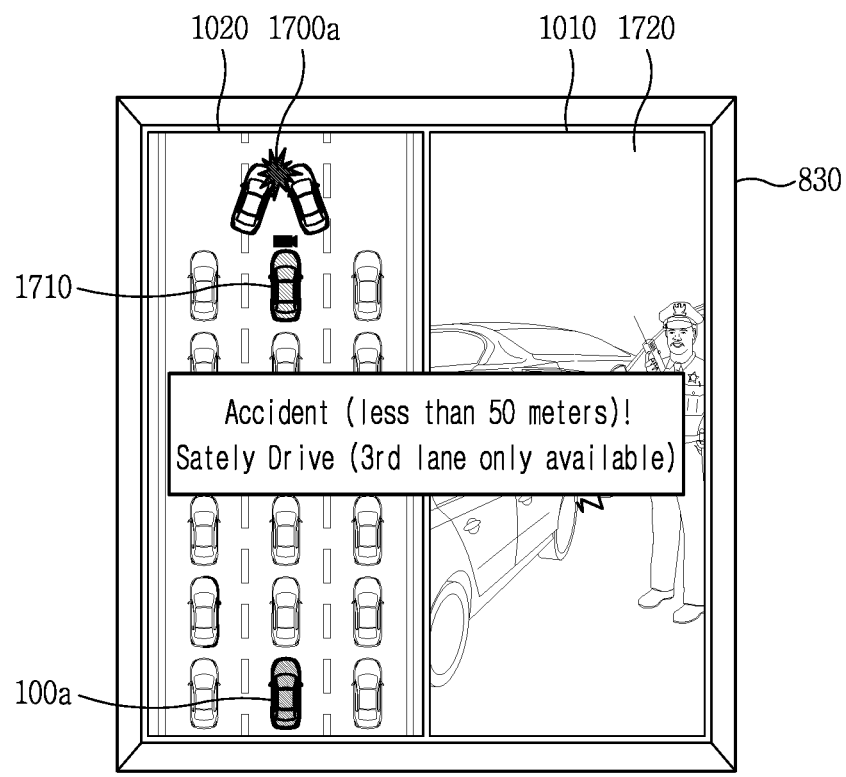

Referring to FIG. 17, said another specific vehicle 1610 may send specific event-related information together with an image captured by itself.

In this case, the processor 870 may further display the specific event-related information 1730 on the display unit 830.

The specific event-related information 1730 may include a type of a specific event, a distance between a specific event and the vehicle, information on a lane on which the vehicle can run, etc.

As shown in FIG. 17, a graphic object 1710 corresponding to another specific vehicle which sends an image may be further provided with an indicator indicating said another specific vehicle sends an image.

A graphic object 1700a corresponding to a specific event may be displayed on the display unit 830, based on information on the specific event.

An image 1720 captured by said another specific vehicle and sent from said another specific vehicle may be displayed on the first region of the display unit 830.

With such a configuration, the present disclosure may provide a user interface capable of immediately outputting an image of a specific event received from another vehicle without a user's manipulation when the specific event occurs.

Figure 18:
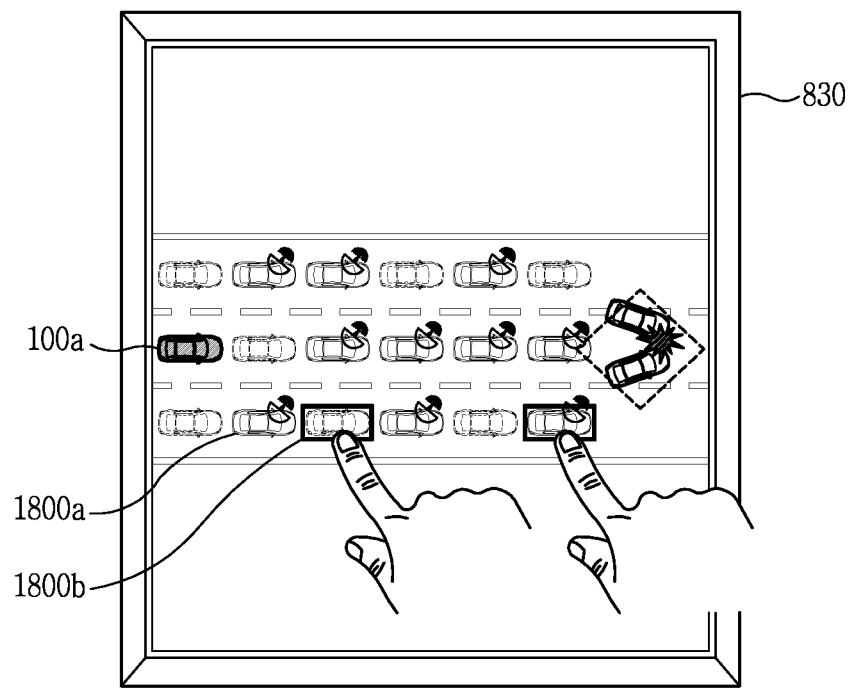
Figure 19:
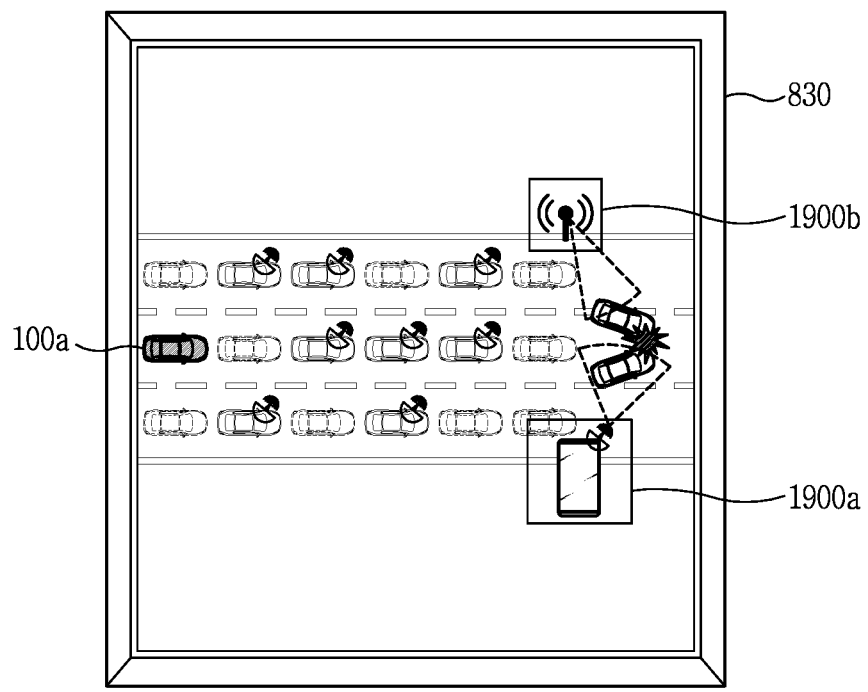
Figure 20:
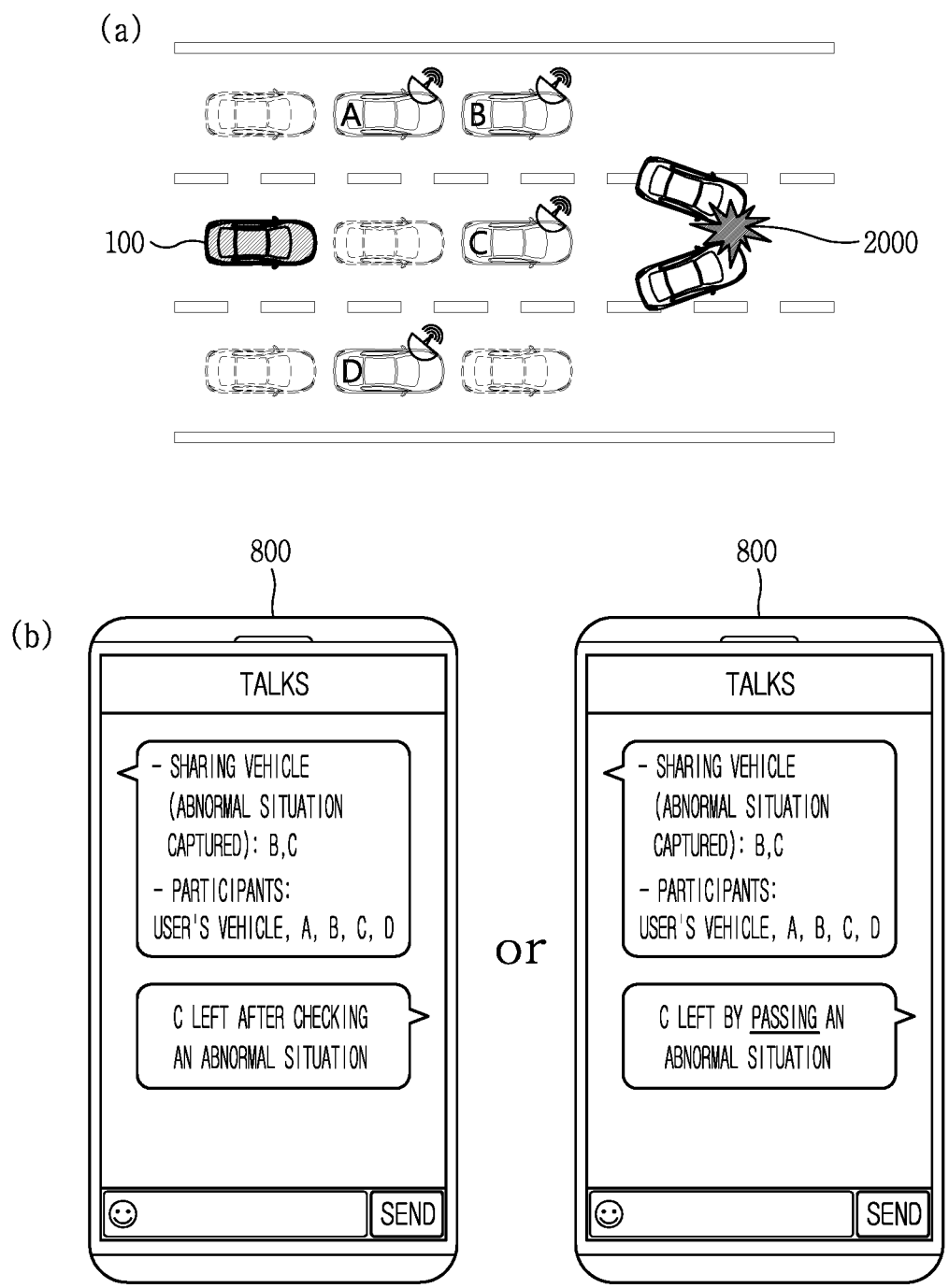
Figure 21:
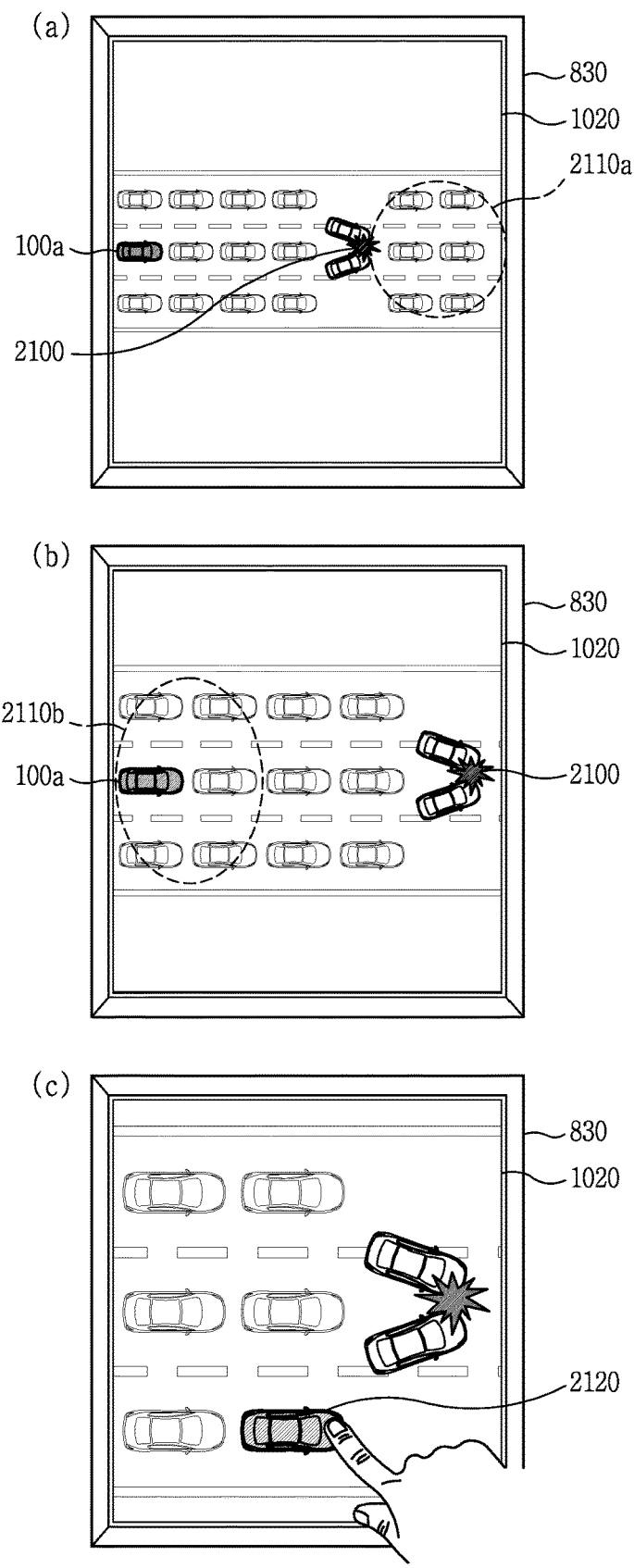

As shown in FIG. 18, the processor 870 may display a first graphic object 1800a corresponding to another vehicle with which the vehicle can perform communication through the communication unit 810, and a second graphic object 1800b corresponding to another vehicle with which the vehicle cannot perform communication through the communication unit 810, on screen information displayed on the second region 1020, in a visually-distinguished manner.

For instance, the first graphic object 1800a may be further provided with an icon indicating a communication enabled state.

Further, the first graphic object 1800a may be displayed in a first display manner (or may be activated) so as to be selectable, and the second graphic object 1800b may be displayed in a second display manner different from the first display manner (or may be inactivated) so as not to be selectable.

If the first graphic object 1800a is selected, the processor 870 may receive an image captured by another vehicle corresponding to the first graphic object 1800a, through the communication unit 810, and may display the received image on the first region 1010.

If the second graphic object 1800b is selected, the processor 870 may output, to the display unit 830, notification information informing that an image captured by another vehicle corresponding to the second graphic object 1800b cannot be received (or notification information informing that communication cannot be performed).

If an external device (e.g., a road side unit (RSU), a base station, or a pedestrian's mobile terminal) which can be connected through the communication unit 810 is detected, the processor 870 may further display graphic objects 1900a, 1900b corresponding to the external device, on the second region 1020 of the display unit 830.

For instance, if a mobile terminal which can perform communication is sensed, the processor 870 may further display the graphic object 1900a corresponding to the mobile terminal, on the second region of the display unit 830. On the other hand, if an RSU which can perform communication is sensed, the processor 870 may further display the graphic object 1900b corresponding to the RSU, on the second region of the display unit 830.

The external device may be an external device which exists within a predetermined distance from a point where a specific event has occurred. The predetermined distance may be defined variously. For instance, the predetermined distance may be a distance where a specific event can be captured, or a distance where specific event-related information can be sensed.

The processor 870 may execute a messenger application so as to enable communication with other vehicles which have sensed a specific event.

For instance, as shown in FIG. 20(a), if a specific event 2000 occurs, the processor 870 may execute a messenger application so as to perform a messenger function with other vehicles which have sensed the specific event.

Then, an execution screen of the messenger application may be output to the display unit 830.

A driver of the vehicle may chat with passengers in other vehicles by using the messenger application.

Then, as the vehicle moves on, another vehicle having passed a specific event among the plurality of other vehicles may terminate the messenger application. In this case, the second vehicle having passed the specific event may leave a chatting room created newly through the messenger application.

If the vehicle passes the specific event, the processor 870 may terminate the messenger application.

If there is another vehicle which sends an image of a specific event through the communication unit 810, the processor 870 may change a display manner of screen information on the second region of the display unit 830 according to a time lapse.

For instance, the processor 870 may output graphic objects corresponding to 'N' other vehicles on the second region of the display unit 830, at a first time. In this case, graphic objects 2110a corresponding to other vehicles positioned in front of a point where a specific event has occurred may be also displayed on the second region of the display unit 830.

Then, if a specific event 2100 occurs and if there is another vehicle which sends an image of the specific event, the processor 870 may output graphic objects corresponding to 'M' other vehicles (the 'M' has a smaller number than the 'N'), on the second region of the display unit 830, at a second time later than the first time, as shown in FIG. 21(b).

In this case, the graphic objects 2110a corresponding to other vehicles positioned in front of a point where a specific event has occurred may not be output to the display unit 830 in the second time.

Since the number of graphic objects output at the second time is smaller than the number of graphic objects output at the first time, the processor 870 may output the graphic objects output at the second time to the display unit 830, in a more enlarged manner than the graphic objects output at the first time.

That is, the processor 870 may output screen information on which another vehicle can be selected, in a gradually-enlarged manner as time lapses, and a reference of the enlargement may be an occurrence point of a specific event, for instance.

Then, if the current time reaches a third time later than the second time as time lapses, the processor 870 may output only graphic objects of other vehicles which exist within a predetermined distance on the basis of the specific event, as shown in FIG. 21(c). In this case, other vehicles 2110b which exist within a predetermined distance from the vehicle may not be output to the display unit 830.

Accordingly, a smaller number of graphic objects than those at the second time may be output at the third time. And the screen information output to the second region may be output to the display unit 830 in a more enlarged manner.

In this state, if one graphic object 2120 is selected among the graphic objects displayed at the third time, the processor 870 may receive an image captured by another vehicle corresponding to the selected graphic object 2120, through the communication unit, and may output the received image to the display unit 830.

With such a configuration, the present disclosure may provide a vehicle control device capable of easily chatting with another vehicle by messenger with respect to a specific event, and a method for controlling a vehicle. Further, the present disclosure may provide an optimized user interface capable of selectively outputting only graphic objects corresponding to other vehicles positioned near a specific event as time lapses so as to easily select another vehicle which captures the specific event.

The processor 870 may display a graphic object corresponding to each of other vehicles in a different manner on screen information output to the second region of the display unit 830, according to whether an image captured by each of other vehicles has been received and output.

That is, the processor 870 may display another vehicle which has checked an image and another vehicle which has not checked an image, in a different manner.

Figure 22:
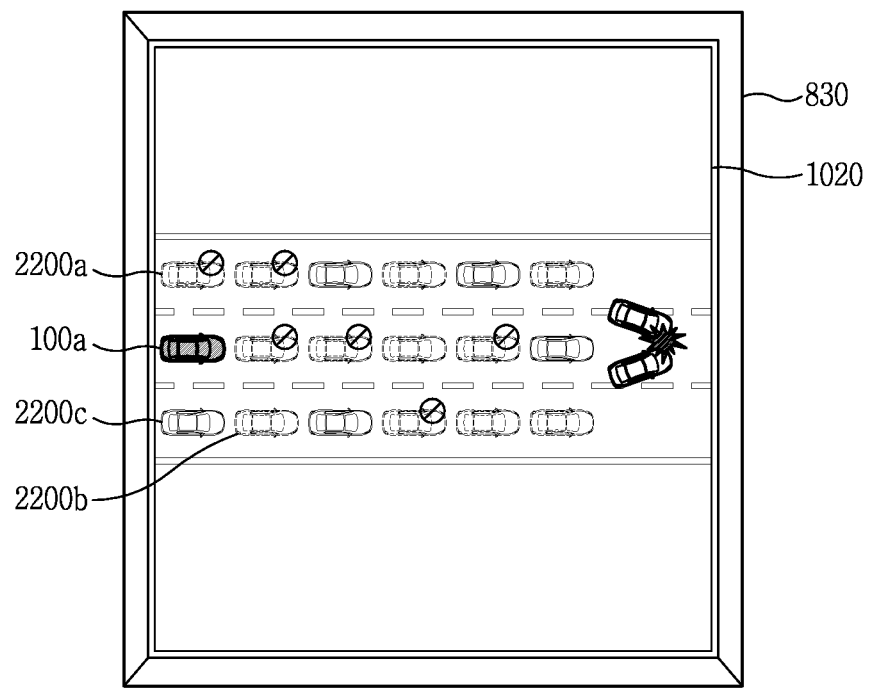

For instance, as shown in FIG. 22, screen information displayed on the second region 1020 of the display unit 830 may include a first graphic object 2200*a* corresponding to another vehicle which cannot send an image, a second graphic object 2200*b* corresponding to another vehicle which has sent (checked) an image, and a third graphic object 2200*c* corresponding to another vehicle which has not sent (checked) an image. Here, the first to third graphic objects may be displayed in a different manner.

That is, the processor 870 of the present disclosure may provide a user interface capable of allowing a user to intuitively check an already-checked image of another vehicle, by displaying another vehicle which cannot send an image, another vehicle which has received (checked) an image, and another vehicle which has not received (checked) an image, in a different manner.

The processor 870 may determine a type of an image output to the first region of the display unit 830, based on a preset type of user input received through the user interface device or the display unit 830.

The preset type of user input may include a touch input applied to the display unit 830, a user input applied to the user interface device (e.g., a button provided at a steering wheel, a jog dial, a knob, etc.), etc.

The preset type of user input may include various types of touches. For instance, the various types of touches may include a short (tap) touch, a long touch, a double touch, a multi-touch, a drag touch, a flick touch, a pinch-in touch, a pinch-out touch, a swype touch, a hovering touch, a force touch, etc.

Hereinafter, the various types of touches will be explained in more detail.

The short (or tap) touch may be a touch released within a predetermined time after a touch object such as a finger and a stylus pen contacts the display unit 830. For instance, the short (or tap) touch may be a touch applied as a touch object contacts the display unit 830 for a short time, e.g., a single click of a mouse.

The long touch may be a touch maintained for more than a predetermined time after a touch object contacts the display unit 830. For instance, the long touch may be a touch maintained for more than a predetermined time after a touch input is applied to the display unit 830 by a touch object. For example, the long touch may be a touch released after being maintained for more than a predetermined time, on a point on a touch screen. Alternatively, the long touch may be understood as a touch corresponding to a touch and hold operation which maintains a contact state of a touch object on the display unit 830, for more than a predetermined time.

The double touch may be a touch implemented as the short touch is consecutively applied to the display unit 830 at least two times within a predetermined time.

The predetermined time explained with the short touch, the long touch and the double touch may be determined according to a user's setting.

The multi touch may be a touch applied to at least two contact points on the display unit 830 at the same time, substantially.

The drag touch may be a touch starting on a first point of the display unit 830 and released on a second point different from the first point, after being consecutively applied in one direction on the display unit 830.

For example, the drag touch may be a touch applied to one point of the display unit 830 by a touch object, and then released on another point after being consecutively extended in a maintained state on the display unit 830.

The drag touch may be a touch applied to one point of the display unit 830 and then consecutively extended therefrom.

The flick touch may be a touch implemented as the drag touch is applied within a predetermined time. For example, the flick touch may be a touch implemented as a touch object which applies the drag touch is released from the display unit 830 within a predetermined time. That is, the flick touch may be understood as a drag touch applied at more than a preset speed.

The swipe touch may be a drag touch applied in a straight line.

The pinch-in touch may be a touch implemented as at least one of first and second touches applied to two points on the display unit 830 (two points spaced apart from each other) is extended in a direction to become close to each other. For instance, the pinch-in touch may be a touch implemented as two fingers contacting two different points on the display unit 830 narrow a gap therebetween.

The pinch-out touch may be a touch implemented as at least one of first and second touches applied to two points on the display unit 830 (two points spaced apart from each other) is extended in a direction to become far from each other. For instance, the pinch-out touch may be a touch implemented as two fingers contacting two different points on the display unit 830 widen a gap therebetween.

The hovering touch may be a touch implemented as a touch object moves at a space without contacting the display unit 830, which may be the proximity touch aforementioned with reference to FIG. 1. For instance, the hovering touch may be a touch corresponding to an operation that the touch object is maintained for more than a predetermine time, at a point spaced apart from the display unit 830.

The force touch may be a touch implemented as a touch object touches the display unit 830 with more than a predetermined pressure.

The aforementioned various types of touches may be applied to a user input applied to the user interface device, in the same or similar manner.

Figure 23:
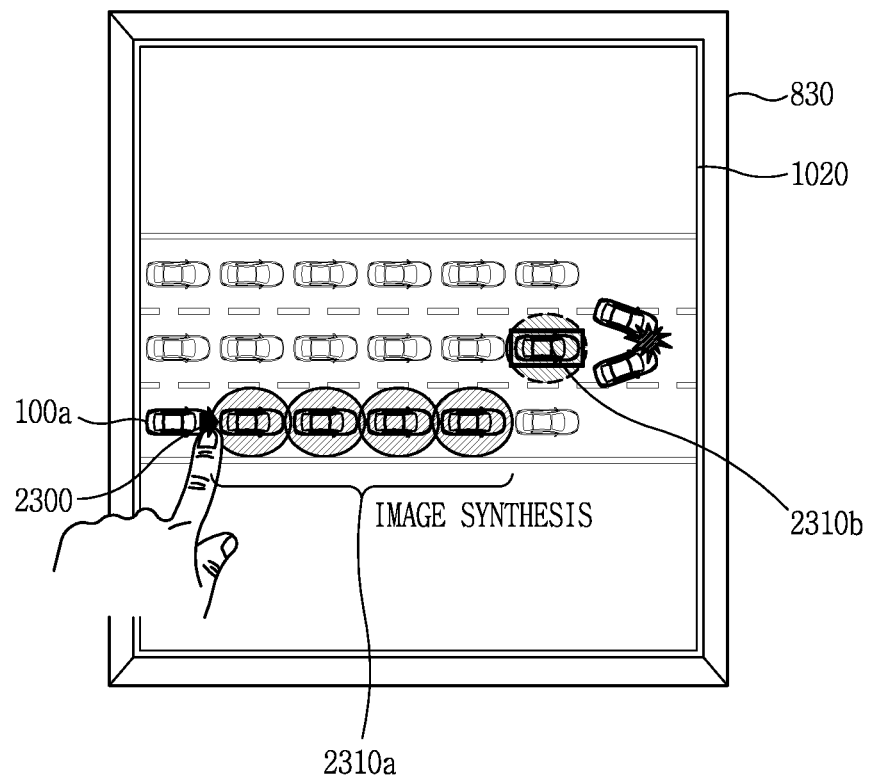

For instance, as shown in FIG. 23, if a preset type of user input (e.g., a force touch) is received on screen information where another vehicle which sends an image can be selected, the processor 870 may synthesize a plurality of images of a predetermined number of other vehicles 2310 positioned in front of the present vehicle. Then, the processor 870 may output the synthesized image to the first region.

If a drag touch is applied to the screen information, the processor 870 may receive images captured by other vehicles from said other vehicles corresponding to graphic objects 2310*a*, 2320*b* to which the drag touch has been applied. Then, the processor 870 may synthesize the received images to output to the first region of the display unit 830.

The processor 870 may determine another vehicle which is to send an image, based on the number of times of user inputs applied to the user interface device.

Figure 24A:
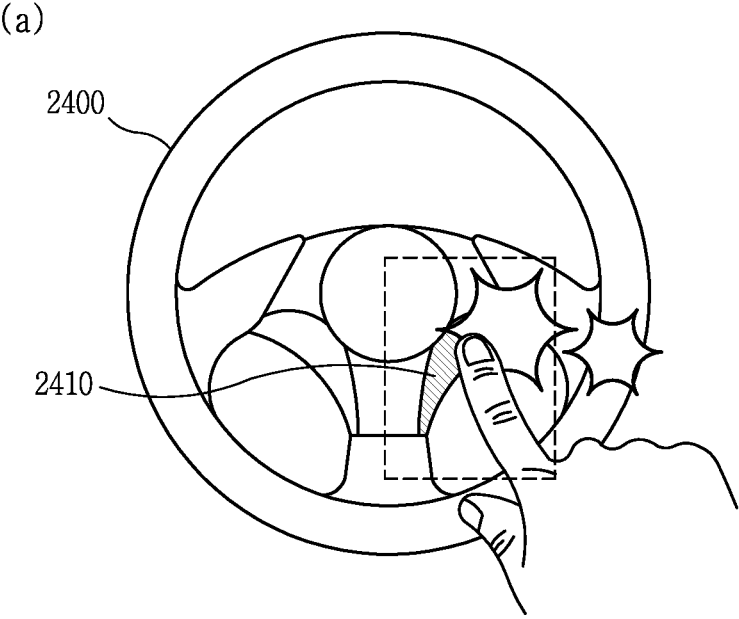
Figure 24A:
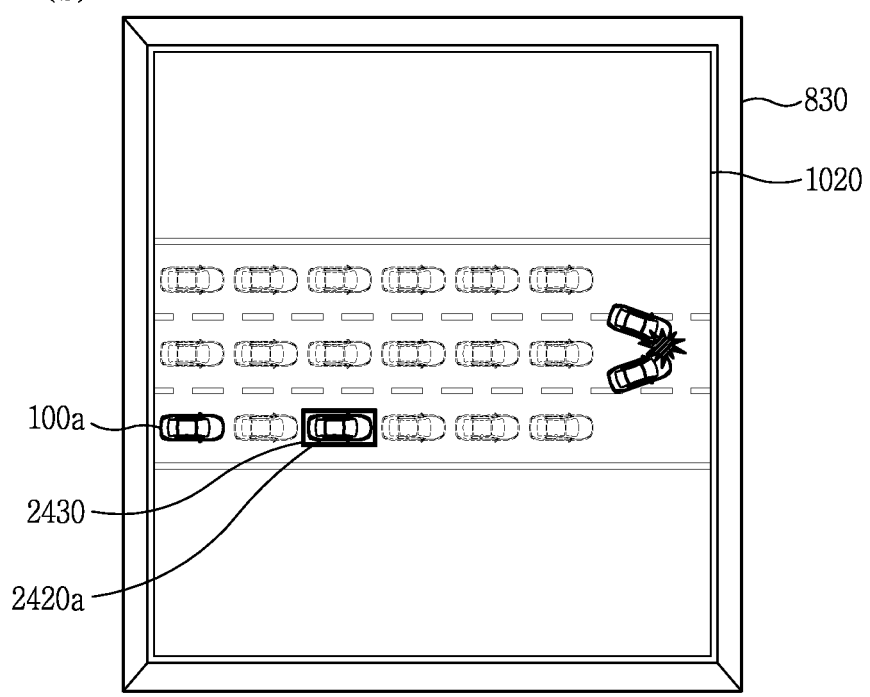

For instance, as shown in FIG. 24*a*, the processor 870 may receive an image captured by a user interface device. In this case, if a double user input to apply a user input twice within a predetermined time is received on a steering wheel 2400, the user interface device may be another vehicle 2420*a* positioned in front of the vehicle by two vehicles.

Further, while an image captured by another first vehicle is being output to the display unit 830, if 'N' user inputs are received on the user interface device within a predetermined time, the processor 870 may receive an image captured by another second vehicle which is in front of said another first vehicle by 'N', through the communication unit, and may output the received image to the display unit.

On the other hand, if more than a predetermined number (e.g., three times) of user inputs are received on the user interface device within a predetermined time, or if a long user input is maintained for a predetermined time, the processor 870 may output an image received through the camera of the sensing unit 820, to the display unit 830.

Figure 24B:
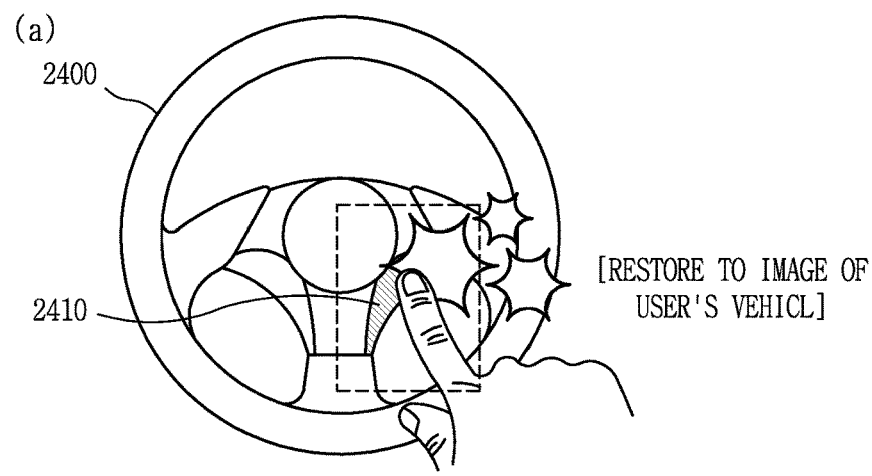
Figure 24B:
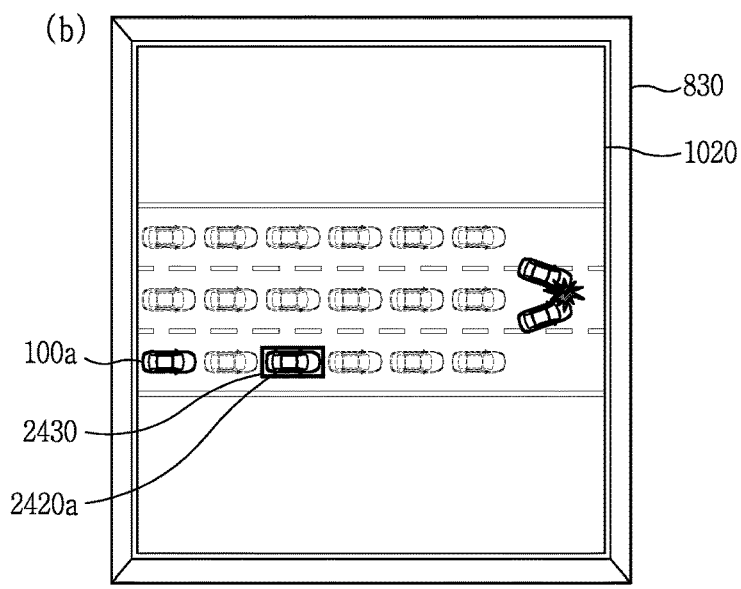
Figure 24B:
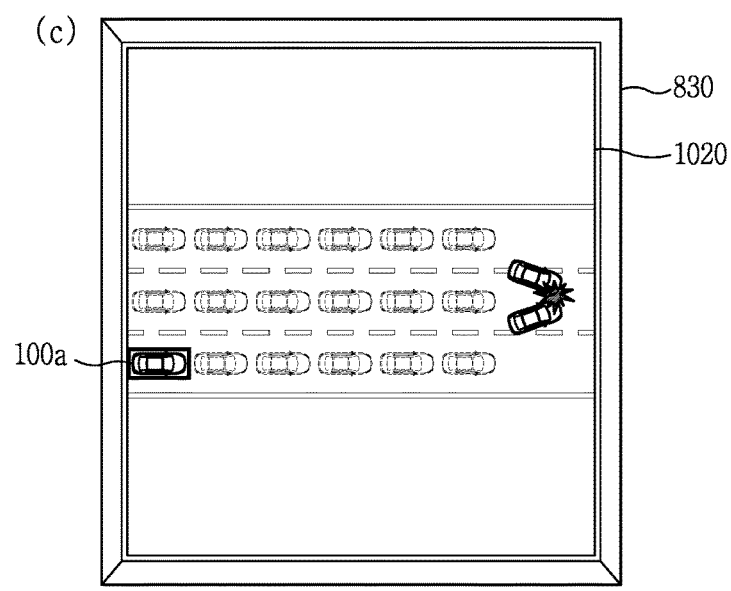

For instance, as shown in FIG. 24B(a), while an image captured by another vehicle is being output to the display unit 830, if more than a predetermined number (e.g., three times) of user inputs are received on the user interface device within a predetermined time, the processor 870 may output an image captured by the camera of the vehicle to the display unit 830.

Further, an edge 2430 may be displayed around a graphic object corresponding to another vehicle which currently captures an image, for recognition of the second vehicle.

Figure 25:
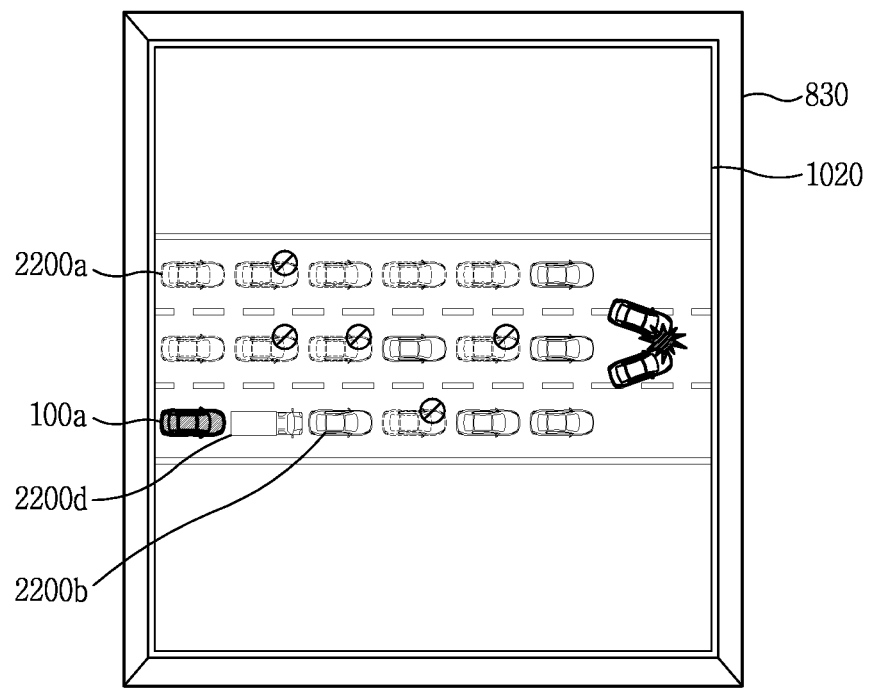

As shown in FIG. 25, the processor 870 may determine a characteristic of a nearby vehicle through the communication unit 810 or the sensing unit 820, and may generate screen information where another vehicle which sends an image can be selected, by reflecting the characteristic of the nearby vehicle.

For instance, the processor 870 may determine another vehicle having a great height such as a truck and an information bus, which can capture a front image at a high place, or another vehicle having a camera of a high resolution, as another vehicle which satisfies a specific condition, based on another vehicle-related information received through the communication unit 810 or another vehicle-related information sensed by the sensing unit 820.

Then, the processor 870 may display a graphic object 2200*d* corresponding to another vehicle which satisfies a specific condition, on the display unit 830, in a visually-distinguished manner from a graphic object 2200*a* corresponding to another vehicle.

Figure 26:
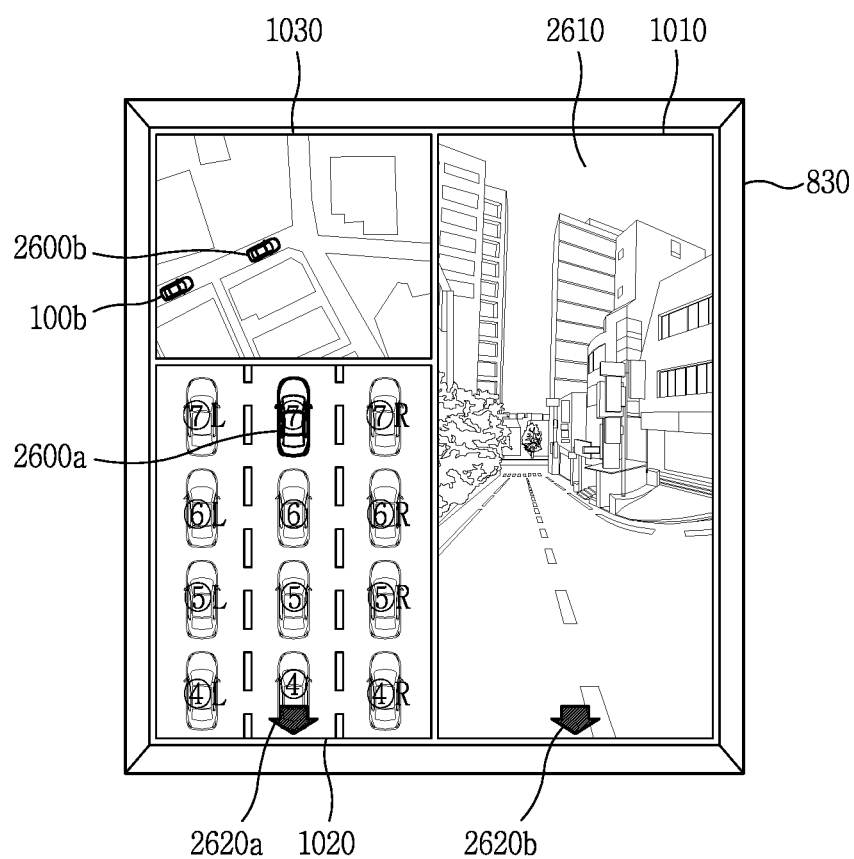

Referring to FIG. 26, the processor 870 may display an image 2610 captured by another vehicle on the first region of the display unit 830, and may display a graphic object 2600*a* corresponding to the second vehicle which sends the image, on the second region of the display unit 830, in a visually-distinguished manner from other graphic objects corresponding to other vehicles. And the processor 870 may display map information indicating a position of the vehicle (the present vehicle) and a position of the second vehicle which sends the image, on the third region of the display unit 830.

The map information may include a graphic object 100*b* corresponding to the vehicle, and a graphic object 2600*b* corresponding to the second vehicle which sends the image.

An icon 2620*b* associated with a function to output an image received through the camera of the vehicle may be output to the first region. If the icon 2620*b* is selected, the processor 870 may output the image received through the camera of the vehicle, to the first region.

If an occurrence position of a specific event is out of a distance where the vehicle can perform communication, the processor 870 may receive information related to the specific event, by passing over another vehicle which exists between the vehicle and the occurrence position of the specific event.

Further, the processor 870 may sense other vehicles having emergency lamps turned on, and may determine that the specific event has occurred near another vehicle farthest from the vehicle, among said other vehicles having emergency lamps turned on.

Figure 27:
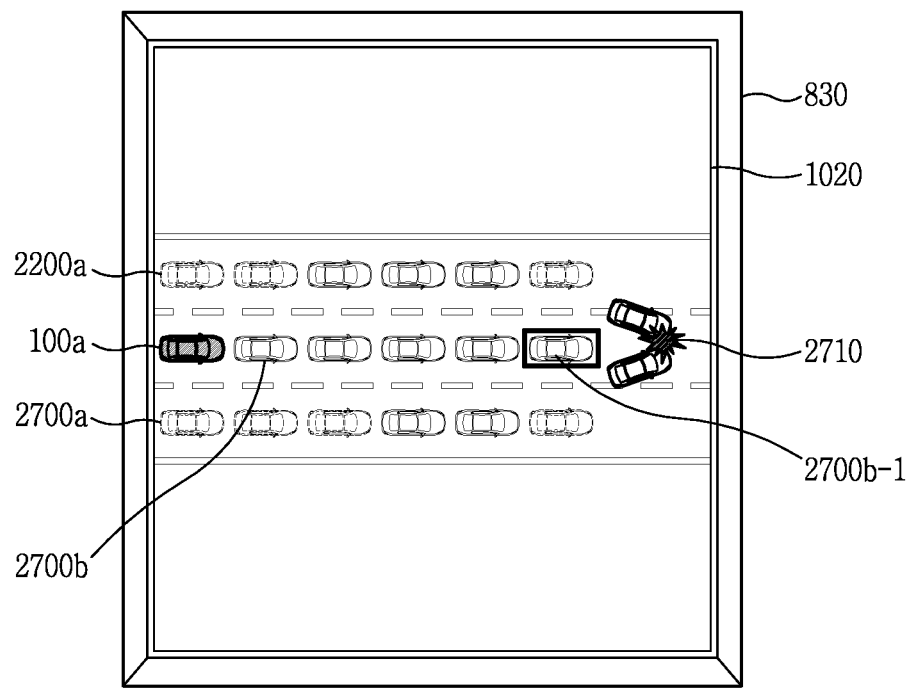

For instance, as shown in FIG. 27, the processor 870 may sense other vehicles 2700*b* having emergency lamps turned on, by the sensing unit 820.

Then, the processor 870 may determine that the specific event has occurred at a position of another vehicle 2700*b*-1 farthest from the vehicle (or within a predetermined distance from a corresponding region), among said other vehicles 2700*b* having emergency lamps turned on.

The implementation of the present disclosure may have at least one of the following advantages.

Firstly, the present disclosure may provide a vehicle control device capable of allowing a user's vehicle to check an image captured by a camera of another vehicle, in real time.

Secondly, the present disclosure may provide a new user interface capable of informing a user of a cause of a vehicular congestion, by using an image captured by another vehicle.

Thirdly, the present disclosure may provide a vehicle control device capable of determining/changing another vehicle which provides an image in an optimized manner, and a method for controlling a vehicle.

Effects of the present disclosure are not limited to the aforementioned effects, and other unexplained effects may be clearly understood by those skilled in the art from the description of the claim scope.

The aforementioned vehicle control device 800 may be included in the vehicle 100.

Further, the operation or the control method of the aforementioned vehicle control device 800 may be applied to that of the vehicle 100 (or the controller 170) in the same or similar manner.

For instance, the control method of the vehicle 100 (or the control method of the vehicle control device 800) may include controlling the communication unit to be connected to another vehicle so as to perform communication, if a preset condition is satisfied; receiving an image captured by a camera provided at the second vehicle through the communication unit; and controlling the display unit to display at least one of the received image and information related to the second vehicle which has sent the image.

A more detailed implementation may be replaced by the aforementioned one, or may be analogically applied in the same or similar manner.

The respective steps may be performed by not only the vehicle control device 800, but also the controller 170 provided at the vehicle 100.

All functions performed by the vehicle control device 800, the configuration or the control methods may be executable by the controller 170 provided at the vehicle 100. That is, all of the control methods explained in this specification may be applicable to not only the control method of the vehicle, but also the control method of the vehicle control device.

Further, the vehicle control device 800 described above may be a mobile terminal. In this case, all functions performed by the vehicle control device 800, the configuration or the control methods may be executable by a controller of the mobile terminal. Further, all of the control methods explained in this specification may be applicable to a control method of a mobile terminal, in the same or similar manner.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the disclosure should be determined by reasonable interpretation of the appended claims and all changes that come within the equivalent scope of the disclosure are included in the scope of the disclosure.

What is claimed is:

1. A vehicle control device, comprising:
a communication unit configured to couple to a first vehicle including the vehicle control device; and
at least one processor configured to:
control, based on a preset condition being satisfied, the communication unit to enable communication between the first vehicle and a second vehicle that is different from the first vehicle,
receive, through the communication unit, an image that has been captured by a camera located at the second vehicle,
control a display unit located at the first vehicle to display, in a first region of the display unit, the image captured by the camera located at the second vehicle,
control the display unit to display, in a second region of the display unit, an information screen that allows a user to select the second vehicle that sent the image,
control the display unit to display, in a third region of the display unit, map information that includes position information of the first vehicle and the second vehicle,
based on receipt of an image of an event from the second vehicle through the communication unit, change display of the information screen in the second region according to a time lapse of the event,
output, to the display unit, a first graphic object corresponding to the second vehicle at a first time point in the time lapse, and
output, to the display unit, a second graphic object corresponding to the second vehicle at a second time point in the time lapse subsequent to the first time point, the second graphic object being enlarged relative to the first graphic object.

2. The vehicle control device of claim 1, further comprising a sensing unit configured to detect an event, wherein the preset condition includes at least one of a detection of the event through the sensing unit, a receipt of information related to the event from the second vehicle through the communication unit, or a receipt of a user's request.

3. The vehicle control device of claim 2, wherein the at least one processor is further configured to:
based on the preset condition being satisfied, control the display unit to display a graphic object that is configured to be selected and that is associated with a function to output the image captured by the camera located at the second vehicle; and
based on a selection of the graphic object, receive, through the communication unit, the image captured by the camera located at the second vehicle, and output the image to the display unit.

4. The vehicle control device of claim 3, wherein the second vehicle includes at least one of a vehicle that sends information related to the event, a vehicle that has captured an image of the event, a vehicle that is located at a position closest to the event among a plurality of vehicles, a vehicle that sends the image of the event to a number of vehicles among the plurality of vehicles, or a vehicle selected by a user input from among the plurality of vehicles.

5. The vehicle control device of claim 3, wherein the sensing unit further includes a first camera located at the first vehicle, and
wherein the at least one processor is further configured to, based on receipt of user's request through the display unit in a state in which the preset condition is not satisfied, output, to the display unit, an image captured by the first camera.

6. The vehicle control device of claim 1, wherein the at least one processor is further configured to:
based on selection of a third vehicle through the information screen while the first region displays a first image captured by the second vehicle, control the display unit to stop display of the first image in the first region, and to display, in the first region, a second image captured by the third vehicle, the third vehicle being different from the second vehicle.

7. The vehicle control device of claim 6, wherein the at least one processor is further configured to, based on the first vehicle receiving the second image from the third vehicle, update, on the map information displayed in the third region, an output position of a graphic object to correspond to a position of the third vehicle.

8. The vehicle control device of claim 1, wherein the at least one processor is further configured to:
control the display unit to display, in the second region, a first plurality of graphic objects that correspond to vehicles that are located within a predetermined distance from the first vehicle;
control the display unit to display, in the second region, a first icon that is associated with a function configured to output a second plurality of graphic objects corresponding to vehicles that are located outside of the predetermined distance from the first vehicle; and
based on a selection of the first icon in the second region, output, to the second region, a second icon that is associated with a function configured to output the first plurality of graphic objects and the second plurality of graphic objects.

9. The vehicle control device of claim 1, wherein the at least one processor is further configured to:
control the display unit to display, in the first region, graphic objects corresponding to a plurality of vehicles around the first vehicle, and indicators that are, respectively, overlaid on the graphic objects and that represent the plurality of vehicles; and based on selection of an indicator from among the indicators, receive, through the communication unit, an image captured by a vehicle corresponding to the selected indicator, and output the received image to the first region.

10. The vehicle control device of claim 9, wherein the information screen further includes at least one graphic object corresponding to the second vehicle, and an indicator that is overlaid on the at least one graphic object and that represents the second vehicle.

11. The vehicle control device of claim 1, wherein the at least one processor is further configured to control the display unit to display event-related information.

12. The vehicle control device of claim 1, wherein the at least one processor is further configured to:

control the display unit to display, in the second region, a first graphic object representing a vehicle that is able to communicate with the first vehicle through the communication unit; and control the display unit to display, in the second region, a second graphic object representing a vehicle that is unable to communicate with the first vehicle through the communication unit, and wherein the first graphic object and the second graphic object are displayed in the information screen and have different appearances.

13. The vehicle control device of claim 12, wherein the at least one processor is further configured to:

based on selection of the first graphic object, receive, through the communication unit, an image captured by a vehicle corresponding to the first graphic object, and display the received image in the first region; and based on selection of the second graphic object, output, to the display unit, notification information that indicates that the communication unit is unable to receive an image captured by a vehicle corresponding to the second graphic object.

14. The vehicle control device of claim 1, wherein the at least one processor is further configured to, based on a detection of an external device that is configured to connect to the communication unit, display, in the second region, a graphic object representing the external device.

15. The vehicle control device of claim 2, wherein the at least one processor is further configured to execute a messenger application that is configured to enable the communication unit to communicate with other vehicles that have detected the event.

16. The vehicle control device of claim 1, wherein the at least one processor is further configured to:

output, to the second region, a first plurality of graphic objects that correspond to vehicles from which the first vehicle receives images configured to be output to the first region; and output, to the second region, a second plurality of graphic objects that correspond to vehicles from which the first vehicle does not receive an image, and wherein the first plurality of graphic objects and the second plurality of graphic objects are displayed in the information screen and have different appearances.

17. The vehicle control device of claim 1, wherein the at least one processor is further configured to determine a type of an image that is output to the first region based on a preset type that has been received through a user interface device or the display unit.

18. A vehicle comprising:

a plurality of wheels;

a power source configured to drive at least one of the plurality of wheels; and a vehicle control device disposed at the vehicle that is a first vehicle, the vehicle control device comprising:

a communication unit, and at least one processor configured to:

control, based on a preset condition being satisfied, the communication unit to enable communication between the first vehicle and a second vehicle that is different from the first vehicle, receive, through the communication unit, an image that has been captured by a camera located at the second vehicle, control a display unit located at the first vehicle to display, in a first region of the display unit, the image captured by the camera located at the second vehicle, control the display unit to display, in a second region of the display unit, an information screen that allows a user to select the second vehicle that sent the image, control the display unit to display, in a third region of the display unit, map information that includes position information of the first vehicle and the second vehicle, based on receipt of an image of an event from the second vehicle through the communication unit, change display of the information screen in the second region according to a time lapse of the event, output, to the display unit, a first graphic object corresponding to the second vehicle at a first time point in the time lapse, and output, to the display unit, a second graphic object corresponding to the second vehicle at a second time point in the time lapse subsequent to the first time point, the second graphic object being enlarged relative to the first graphic object.

19. The vehicle control device of claim 1, wherein the first graphic object includes a first plurality of icons representing a plurality of vehicles located in a first area related to the event, wherein the second graphic object includes a second plurality of icons representing a portion of the plurality of vehicles located in a second area related to the event, and wherein the second area is smaller than the first area such that a number of the second plurality of icons in the second image is less than a number of the first plurality of icons in the first image.

20. The vehicle control device of claim 19, wherein a size of each of the second plurality of icons is greater than a size of each of the first plurality of icons.

* * * * *